(12) United States Patent
Poole et al.

(10) Patent No.: US 11,460,892 B2
(45) Date of Patent: Oct. 4, 2022

(54) GLASS COVER MEMBER FOR AN ELECTRONIC DEVICE ENCLOSURE

(71) Applicant: Apple Inc., Cupertino, CA (US)

(72) Inventors: Joseph C. Poole, Hayward, CA (US); Matthew S. Rogers, San Jose, CA (US); Dale N. Memering, Langhome, PA (US)

(73) Assignee: APPLE INC., Cupertino, CA (US)

( * ) Notice: Subject to any disclaimer, the term of this patent is extended or adjusted under 35 U.S.C. 154(b) by 15 days.

(21) Appl. No.: 17/185,723

(22) Filed: Feb. 25, 2021

(65) Prior Publication Data

US 2021/0303031 A1 Sep. 30, 2021

Related U.S. Application Data

(60) Provisional application No. 63/001,294, filed on Mar. 28, 2020.

(51) Int. Cl.
*G06F 1/16* (2006.01)

(52) U.S. Cl.
CPC .......... *G06F 1/1656* (2013.01); *G06F 1/1626* (2013.01); *G06F 1/1686* (2013.01)

(58) Field of Classification Search
CPC ..... G06F 1/1626; G06F 1/1656; G06F 1/1686
See application file for complete search history.

(56) References Cited

U.S. PATENT DOCUMENTS

| | | | |
|---|---|---|---|
| 2,795,084 A | 6/1957 | Littleton | |
| 3,410,673 A | 11/1968 | Marusak | |
| 3,433,611 A | 3/1969 | Kubican | |
| 3,464,880 A | 9/1969 | Rinehart | |
| 3,737,294 A | 6/1973 | Dumbaugh, Jr. et al. | |
| 3,746,526 A | 7/1973 | Giffen | |
| 3,899,315 A | 8/1975 | Siegmund | |
| 4,054,895 A * | 10/1977 | Ham | H01L 29/78612 438/164 |
| 4,070,211 A * | 1/1978 | Harari | H01L 21/3081 438/164 |
| 4,209,229 A | 6/1980 | Rittler | |

(Continued)

FOREIGN PATENT DOCUMENTS

| | | |
|---|---|---|
| CN | 103986803 | 8/2013 |
| CN | WO2014/022681 | 2/2014 |

(Continued)

OTHER PUBLICATIONS

U.S. Appl. No. 17/553,105, filed Dec. 16, 2021, pending.

(Continued)

*Primary Examiner* — Adrian S Wilson
(74) *Attorney, Agent, or Firm* — Brownstein Hyatt Farber Schreck, LLP

(57) ABSTRACT

The disclosure provides members formed from multiple layers as well as enclosures and electronic devices that include the members. The members include glass members formed from multiple layers of glass. In some cases, the members include a protruding feature provided over a camera assembly of the electronic device. The member may define one or more through-holes that extend through the protruding feature. The protruding feature may define a textured region that may be configured to provide a matte or glossy appearance.

20 Claims, 17 Drawing Sheets

(56) References Cited

U.S. PATENT DOCUMENTS

| | | | | |
|---|---|---|---|---|
| 4,339,300 A | * | 7/1982 | Noble | C30B 23/02 117/9 |
| 4,735,917 A | * | 4/1988 | Flatley | H01L 21/31051 257/E21.243 |
| 4,849,299 A | * | 7/1989 | Loth | C30B 29/20 427/527 |
| 5,122,177 A | | 6/1992 | Yoshizama et al. | |
| 5,173,453 A | | 12/1992 | Beall et al. | |
| 5,273,553 A | | 12/1993 | Hoshi et al. | |
| 6,055,053 A | | 4/2000 | Lesniak | |
| 6,067,005 A | | 5/2000 | DeVolpi | |
| 6,169,256 B1 | | 1/2001 | Hanahara | |
| 6,406,769 B1 | * | 6/2002 | Delabre | B24B 13/00 428/66.5 |
| 6,809,278 B2 | | 10/2004 | Tsubaki | |
| 6,928,224 B2 | | 8/2005 | Beall et al. | |
| 7,115,827 B2 | | 10/2006 | Tseng | |
| 7,240,519 B2 | | 7/2007 | Schwartz et al. | |
| 7,459,199 B2 | | 12/2008 | Skeen | |
| 7,497,093 B2 | | 3/2009 | Rosenflanz | |
| 7,507,918 B2 | | 3/2009 | Kazama | |
| 7,799,158 B2 | | 9/2010 | Yokoyama et al. | |
| 7,902,474 B2 | | 3/2011 | Mittleman | |
| 7,915,556 B2 | | 3/2011 | Ou | |
| 7,966,785 B2 | * | 6/2011 | Zadesky | B32B 17/1055 52/656.1 |
| 8,003,217 B2 | | 8/2011 | Rosenflanz | |
| 8,050,019 B2 | | 11/2011 | Wennemer | |
| 8,092,737 B2 | | 1/2012 | Chang et al. | |
| 8,212,455 B2 | | 7/2012 | Yura et al. | |
| 8,277,704 B2 | | 10/2012 | Matsushima et al. | |
| 8,379,159 B2 | | 2/2013 | Hsu | |
| 8,431,849 B2 | | 4/2013 | Chen | |
| 8,446,264 B2 | | 5/2013 | Tanase | |
| 8,665,160 B2 | | 3/2014 | Uttermann et al. | |
| 8,717,513 B2 | * | 5/2014 | Park | G06F 1/1637 349/110 |
| 8,783,065 B2 | | 7/2014 | Schillert et al. | |
| 8,840,997 B2 | | 9/2014 | Koyama et al. | |
| 8,898,824 B2 | | 12/2014 | Neidich et al. | |
| 9,001,503 B1 | | 4/2015 | Hibino | |
| 9,030,440 B2 | | 5/2015 | Pope | |
| 9,069,198 B2 | * | 6/2015 | Kim | G02F 1/133512 |
| 9,125,298 B2 | | 9/2015 | Russell-Clarke | |
| 9,134,547 B2 | | 9/2015 | McCabe et al. | |
| 9,140,522 B1 | | 9/2015 | Miller et al. | |
| 9,154,678 B2 | * | 10/2015 | Kwong | H04N 5/2254 |
| 9,193,625 B2 | | 11/2015 | Bookbinder et al. | |
| 9,232,672 B2 | | 1/2016 | Kwong | |
| 9,242,889 B2 | | 1/2016 | Yamakaji et al. | |
| 9,249,045 B2 | | 2/2016 | Gabel et al. | |
| 9,263,209 B2 | | 2/2016 | Chen | |
| 9,302,937 B2 | | 4/2016 | Gulati et al. | |
| 9,321,677 B2 | | 4/2016 | Chang et al. | |
| 9,359,251 B2 | | 6/2016 | Bookbinder et al. | |
| 9,375,900 B2 | | 6/2016 | Tsuchiya et al. | |
| 9,390,930 B2 | * | 7/2016 | Rogers | H01L 21/324 |
| 9,392,706 B2 | * | 7/2016 | Yoo | H03K 17/941 |
| 9,429,997 B2 | | 8/2016 | Myers et al. | |
| 9,474,174 B2 | | 10/2016 | Motohashi | |
| 9,516,149 B2 | | 12/2016 | Wright et al. | |
| 9,522,836 B2 | | 12/2016 | Gulati et al. | |
| 9,524,413 B2 | | 12/2016 | Kim | |
| 9,632,537 B2 | * | 4/2017 | Memering | G06F 1/1613 |
| 9,674,322 B2 | | 6/2017 | Motohashi et al. | |
| 9,678,540 B2 | * | 6/2017 | Memering | G06F 1/1626 |
| 9,697,409 B2 | | 7/2017 | Myers | |
| 9,718,727 B2 | | 8/2017 | Bookbinder et al. | |
| 9,728,349 B2 | | 8/2017 | Huang | |
| 9,840,435 B2 | | 12/2017 | Ohara et al. | |
| 9,870,880 B2 | | 1/2018 | Zercoe | |
| 9,890,074 B2 | | 2/2018 | Liu | |
| 9,897,574 B2 | | 2/2018 | Roussev et al. | |
| 9,902,138 B2 | | 2/2018 | Edwards | |
| 9,902,641 B2 | | 2/2018 | Hall et al. | |
| 9,941,074 B2 | | 4/2018 | Tu | |
| 9,946,302 B2 | | 4/2018 | Franklin et al. | |
| 9,963,374 B2 | | 5/2018 | Jouanno et al. | |
| 10,133,156 B2 | | 11/2018 | Pilliod et al. | |
| 10,141,133 B2 | | 11/2018 | Bae | |
| 10,146,982 B2 | | 12/2018 | Hsu | |
| 10,189,228 B2 | | 1/2019 | Couillard et al. | |
| 10,206,298 B2 | | 2/2019 | Memering et al. | |
| 10,286,631 B2 | | 5/2019 | Alder et al. | |
| 10,318,783 B2 | | 6/2019 | Kang | |
| 10,324,496 B2 | * | 6/2019 | Kwong | H04N 5/2254 |
| 10,357,945 B2 | | 7/2019 | Beall et al. | |
| 10,494,860 B1 | * | 12/2019 | Jones | B60J 1/008 |
| 10,513,455 B2 | | 12/2019 | Cook et al. | |
| 10,611,666 B2 | | 4/2020 | Jones et al. | |
| 10,694,010 B2 | * | 6/2020 | Jones | H04N 5/2257 |
| 10,702,211 B2 | * | 7/2020 | Clavelle | A61B 5/681 |
| 10,800,141 B2 | | 10/2020 | Bartlow et al. | |
| 10,827,635 B1 | * | 11/2020 | Limarga | C03C 17/28 |
| 10,875,277 B2 | | 12/2020 | Aoki et al. | |
| 10,917,505 B2 | * | 2/2021 | Jones | G02B 13/0055 |
| 10,919,270 B2 | | 2/2021 | Oh et al. | |
| 11,192,823 B2 | * | 12/2021 | Li | H04M 1/026 |
| 11,199,929 B2 | * | 12/2021 | Poole | G02B 1/118 |
| 2003/0040346 A1 | * | 2/2003 | Fukuda | G06F 1/169 455/575.1 |
| 2003/0062490 A1 | * | 4/2003 | Fujieda | G06F 1/1686 250/556 |
| 2004/0003627 A1 | | 1/2004 | Hashima | |
| 2004/0041504 A1 | * | 3/2004 | Ozolins | G02F 1/1333 313/110 |
| 2004/0105026 A1 | * | 6/2004 | Campbell | H04N 5/2254 348/340 |
| 2005/0135724 A1 | * | 6/2005 | Helvajian | C03C 10/00 385/14 |
| 2005/0176506 A1 | | 8/2005 | Goto | |
| 2008/0049980 A1 | | 2/2008 | Castaneda | |
| 2009/0040737 A1 | | 2/2009 | Shimura | |
| 2010/0013786 A1 | * | 1/2010 | Nishikawa | G06F 3/04886 345/173 |
| 2010/0108486 A1 | | 5/2010 | Yoshida | |
| 2010/0127420 A1 | | 5/2010 | Dannoux | |
| 2010/0148996 A1 | | 6/2010 | Wang | |
| 2010/0279068 A1 | | 11/2010 | Cook et al. | |
| 2010/0285310 A1 | | 11/2010 | Izutani et al. | |
| 2010/0330814 A1 | * | 12/2010 | Yokota | H01L 21/3105 438/771 |
| 2011/0038115 A1 | | 2/2011 | Halkosaari | |
| 2011/0041987 A1 | | 2/2011 | Hori et al. | |
| 2011/0177300 A1 | * | 7/2011 | Hankey | G02B 5/26 428/210 |
| 2011/0253520 A1 | | 10/2011 | Lim | |
| 2012/0052271 A1 | | 3/2012 | Gomez et al. | |
| 2012/0176760 A1 | | 7/2012 | Cohen et al. | |
| 2012/0206669 A1 | * | 8/2012 | Kim | G02F 1/133308 349/153 |
| 2012/0236526 A1 | | 9/2012 | Weber | |
| 2012/0250273 A1 | | 10/2012 | Kuo | |
| 2012/0327325 A1 | * | 12/2012 | Park | G06F 1/1686 349/58 |
| 2013/0128434 A1 | | 5/2013 | Yamamoto et al. | |
| 2013/0236699 A1 | * | 9/2013 | Prest | C30B 29/20 428/220 |
| 2014/0116090 A1 | | 5/2014 | Lee et al. | |
| 2014/0151320 A1 | | 6/2014 | Chang et al. | |
| 2014/0272298 A1 | | 9/2014 | Memering | G02B 1/14 427/255.15 |
| 2014/0285956 A1 | * | 9/2014 | Russell-Clarke | H05K 5/02 361/679.01 |
| 2014/0311882 A1 | | 10/2014 | Terashita | |
| 2015/0002993 A1 | | 1/2015 | Lee | |
| 2015/0030834 A1 | | 1/2015 | Morey et al. | |
| 2015/0030859 A1 | * | 1/2015 | Rogers | C03C 21/002 428/428 |
| 2015/0044445 A1 | | 2/2015 | Garner et al. | |
| 2015/0077830 A1 | * | 3/2015 | Lin | G02F 1/163 359/275 |

(56) References Cited

U.S. PATENT DOCUMENTS

| | | | |
|---|---|---|---|
| 2015/0093581 A1 | 4/2015 | Murata et al. | |
| 2015/0104618 A1 | 4/2015 | Hayashi et al. | |
| 2015/0122406 A1 | 5/2015 | Fisher et al. | |
| 2015/0163382 A1* | 6/2015 | Kwong | G06F 1/1656 348/375 |
| 2015/0165548 A1 | 6/2015 | Marjanovic et al. | |
| 2015/0202854 A1 | 7/2015 | Tsuchiya et al. | |
| 2015/0212247 A1 | 7/2015 | Borrelli et al. | |
| 2015/0232366 A1 | 8/2015 | Fredholm et al. | |
| 2015/0241732 A1* | 8/2015 | Kim | G02F 1/1341 349/110 |
| 2015/0245514 A1 | 8/2015 | Choung | |
| 2015/0274572 A1* | 10/2015 | Wada | C03B 40/005 65/273 |
| 2015/0299036 A1 | 10/2015 | Ukrainczyk et al. | |
| 2016/0028931 A1* | 1/2016 | Kwong | G06F 1/1637 348/375 |
| 2016/0137550 A1 | 5/2016 | Murata et al. | |
| 2016/0224142 A1* | 8/2016 | Yang | G06V 40/12 |
| 2016/0270247 A1* | 9/2016 | Jones | B32B 3/02 |
| 2016/0357294 A1* | 12/2016 | Ozeki | B32B 17/06 |
| 2016/0377768 A1* | 12/2016 | Wilson | G02B 5/0289 205/120 |
| 2017/0059749 A1 | 3/2017 | Wakatsuki et al. | |
| 2017/0066223 A1 | 3/2017 | Notsu et al. | |
| 2017/0282503 A1 | 10/2017 | Peng et al. | |
| 2017/0300114 A1* | 10/2017 | Matsuyuki | G06F 3/016 |
| 2017/0305788 A1 | 10/2017 | Nikulin | |
| 2017/0334770 A1 | 11/2017 | Luzzato et al. | |
| 2017/0340518 A1 | 11/2017 | Logunov et al. | |
| 2017/0364172 A1* | 12/2017 | Kim | G06F 1/1626 |
| 2017/0372112 A1 | 12/2017 | Baker et al. | |
| 2018/0009697 A1* | 1/2018 | He | C03B 23/0307 |
| 2018/0024274 A1* | 1/2018 | Rogers | G02B 1/113 359/652 |
| 2018/0086026 A1 | 3/2018 | Nguyen | B32B 7/10 |
| 2018/0086663 A1 | 3/2018 | Luzzato et al. | |
| 2018/0088399 A1 | 3/2018 | Fukushi et al. | |
| 2018/0125756 A1 | 5/2018 | Gerrish et al. | |
| 2018/0126704 A1* | 5/2018 | Zhang | C03B 9/03 |
| 2018/0134606 A1 | 5/2018 | Wagner et al. | |
| 2018/0154615 A1 | 6/2018 | Dohn et al. | |
| 2018/0237325 A1 | 8/2018 | Li et al. | |
| 2018/0282207 A1 | 10/2018 | Fujii et al. | |
| 2018/0304588 A1 | 10/2018 | Harris et al. | |
| 2018/0304825 A1 | 10/2018 | Mattelet et al. | |
| 2018/0326704 A1 | 11/2018 | Harris et al. | |
| 2018/0370843 A1 | 12/2018 | Gross et al. | |
| 2019/0022979 A1 | 1/2019 | Luzzato et al. | |
| 2019/0030861 A1 | 1/2019 | Bellman et al. | |
| 2019/0033144 A1 | 1/2019 | Andrews et al. | |
| 2019/0037690 A1* | 1/2019 | Wilson | G02B 5/285 |
| 2019/0134944 A1 | 5/2019 | Dawson-Elli | |
| 2019/0160787 A1 | 5/2019 | Bartlow et al. | |
| 2019/0161402 A1 | 5/2019 | Harris et al. | |
| 2019/0169060 A1 | 6/2019 | Jones et al. | |
| 2019/0177215 A1 | 6/2019 | Jin et al. | |
| 2019/0219463 A1 | 7/2019 | Orihara et al. | |
| 2019/0263708 A1* | 8/2019 | Bookbinder | C03B 23/0307 |
| 2019/0293838 A1 | 9/2019 | Haba et al. | |
| 2020/0014780 A1* | 1/2020 | Jones | H04N 5/2253 |
| 2020/0017406 A1 | 1/2020 | Wilson et al. | |
| 2020/0039186 A1 | 2/2020 | Yuan et al. | |
| 2020/0055281 A1 | 2/2020 | Yoon et al. | |
| 2020/0095159 A1 | 3/2020 | Marshall et al. | |
| 2020/0301527 A1* | 9/2020 | Poole | G06F 1/1616 |
| 2020/0339472 A1 | 10/2020 | Yoon et al. | |
| 2020/0346525 A1 | 11/2020 | Mannheim Astete et al. | |
| 2020/0369560 A1 | 11/2020 | Takeda et al. | |
| 2020/0407266 A1 | 12/2020 | Suzuki et al. | |
| 2021/0009469 A1* | 1/2021 | Marshall | C03C 17/30 |
| 2021/0014992 A1* | 1/2021 | Limarga | C03C 17/38 |
| 2021/0016547 A1 | 1/2021 | Bartlow et al. | |
| 2021/0033757 A1* | 2/2021 | Wilson | G02F 1/133331 |
| 2021/0072789 A1* | 3/2021 | Rogers | G06F 1/1656 |
| 2021/0361233 A1* | 11/2021 | Wilson | G01J 1/0214 |
| 2022/0117094 A1* | 4/2022 | Prest | G06F 1/1626 |

FOREIGN PATENT DOCUMENTS

| | | |
|---|---|---|
| CN | WO2015/095089 | 6/2015 |
| CN | 104837781 | 8/2015 |
| CN | 106007345 | 10/2016 |
| CN | 106341962 | 1/2017 |
| CN | 106485275 | 3/2017 |
| CN | 108017263 | 5/2018 |
| CN | 108285263 | 7/2018 |
| CN | 108545917 | 9/2018 |
| CN | 108632510 | 10/2018 |
| CN | 215010334 | 12/2021 |
| DE | 102016107630 | 10/2017 |
| JP | S6042176 | 9/1985 |
| JP | S6271215 | 5/1987 |
| WO | WO2010/077845 | 7/2010 |
| WO | WO2012/027660 | 3/2012 |
| WO | WO2012/074983 | 6/2012 |
| WO | WO2014/022356 | 2/2014 |
| WO | WO2015/031420 | 3/2015 |
| WO | WO2016/065118 | 4/2016 |
| WO | WO2017/196800 | 11/2017 |
| WO | WO2019/199791 | 10/2019 |

OTHER PUBLICATIONS

U.S. Appl. No. 17/553,228, filed Dec. 16, 2021, pending; and.
U.S. Appl. No. 17/559,129, filed Dec. 22, 2021, pending.
Aben et al., "A New Method for Tempering Stress Measurement in Glass Panels," Estonian Journal of Engineering, vol. 19, No. 4, pp. 292-297, 2013.
Bourhis, "Production Control of Residual Stresses," Glass Mechanics and Technology, Second Edition, pp. 236-243, 2014.
Decourcelle, et al., "Controlling Anisotropy," Conference Proceedings, All Eyes on Glass, Glass Performance Days, Tampere, Finland, Jun. 28-30, 2017.
Mao et al., "Fabrication and characterization of 20 nm planar nanofluidic channels by glass—glass and glass—silicon bonding," www.rsc.org/loc, 8 pages, Jun. 30, 2005.
Moriceau et al., "Overview of recent direct wafer bonding advances and applications," Advances in Natural Sciences: Nanoscience and Nanotechnology, vol. 1, No. 043004, 11 pages, 2010.
Dudutis et al., Bessel beam asymmetry control for glass dicing applications, Procedia CIRP 74, pp. 333-338, 2018.
Gottmann et al., "Microcutting and Hollow 3D Microstructures in Glasses by In-Volume Selective Laser-induced Etching," Journal of Laser Micro / Nanoengineering, vol. 8, No. 1, pp. 15-18, Jan. 2013.
Jenne et al., "High-quality Tailored-edge Cleaving Using Aberration-corrected Bessel-like Beams," arXiv:2010.10226v1 [physics.optics], May 8, 2018.
Ungaro et al., "Using phase-corrected Bessel beams to cut glass substrates with a chamfered edge," Applied Optics, vol. 60, No. 3, p. 714, Dec. 10, 2020.

* cited by examiner

GLASS COVER MEMBER FOR AN ELECTRONIC DEVICE ENCLOSURE

CROSS-REFERENCE TO RELATED APPLICATION(S)

This application is a nonprovisional application of and claims the benefit of U.S. Provisional Patent Application No. 63/001,294, filed Mar. 28, 2020 and titled "Glass Cover Member for an Electronic Device Enclosure," the disclosure of which is hereby incorporated herein by reference in its entirety.

FIELD

The described embodiments relate generally to a member for an electronic device enclosure. More particularly, the present embodiments relate to a glass cover member formed from two or more layers of glass and defining a protruding feature.

BACKGROUND

Enclosures for electronic devices traditionally include multiple components. For example, an electronic device may include a housing component and one or more cover members. Enclosure components formed from conventional plastic or metal materials may be shaped and textured using traditional molding and/or machining techniques. However, it may be more difficult to shape or texture enclosure components formed from more brittle materials such as glass.

SUMMARY

The disclosure provides members for electronic devices which are formed from multiple layers, such as multiple layers of glass. Typically, the member is included in an enclosure for an electronic device. For example, the member may be a glass member included in a cover assembly. Enclosures and electronic devices including the members are also disclosed herein.

In some cases, a member defines a feature that protrudes beyond an adjacent region of its exterior surface. As an example, such a protruding feature may be provided over a camera assembly of the electronic device. One or more holes may extend through the protruding feature to facilitate positioning of an optical module such as a camera module.

In some examples, a portion of the member including the protruding feature is thicker than a surrounding portion of the member. The thicker portion of a glass member may be formed from a greater number of glass layers than the surrounding portion of the glass member. For example, the thicker portion of the glass member (including the protruding feature) may be formed from two or more glass layers while the surrounding portion may be formed from a single glass layer. The two or more glass layers may be bonded (e.g., fused) together. A composition of each of the glass layers may be substantially the same. The glass member is typically chemically strengthened as described in greater detail below.

In some cases, the member retains a layered structure and has a distinct bond region between the layers. For example, a glass member may include a first glass layer extending substantially across the width and the length of the glass member. The glass member may further include a second glass layer having smaller lateral dimensions and at least partially defining the protruding feature. The second glass layer may at least partially define a curved side surface (also referred to as a sidewall) of the protruding feature and the bond region may extend across the protruding feature. In some cases, the protruding feature may comprise a portion of the first glass layer as well as the second glass layer.

In some cases, a glass member is formed from two or more glass layers that fuse together so completely that the fusion zone between the glass layers is less distinct. However, one or more artifacts from the fusion process may still be detected upon close examination, as discussed in more detail below. An example of such a glass member may include a first glass component (alternately, a first glass piece or a first glass portion) extending substantially across the width and the length of the glass member and formed from a first glass layer. The glass member may also include a second glass component (alternately, a second glass piece or second glass portion) at least partially defining the protruding feature and formed from a second glass layer. The protruding feature may also comprise some of the first glass component in addition to the second glass component.

In some examples, the protruding feature may define a first textured region and the adjacent portion of the member may define a second textured region. In some cases, the first textured region may have different properties than the second textured region. For example, the first textured region may have a different gloss than the second textured region. The gloss may be measured for light incident at a particular angle (e.g., 60 degrees) with respect to the surface normal and the value of the gloss may be specified in terms of gloss units as described in greater detail with respect to FIG. 10.

The disclosure provides an electronic device comprising a display and an enclosure including a front cover assembly including a front member positioned over the display and a rear cover assembly including a rear member. The rear member defines a feature that protrudes with respect to a base region of an exterior surface of the rear member. The rear member comprises a first glass component defining the base region of the exterior surface and a second glass component bonded to the first glass component and at least partially defining the feature. The electronic device further comprises a camera assembly coupled to an interior surface of the rear cover assembly, the camera assembly comprising a camera module positioned at least partially within a hole extending through the first glass component and the second glass component.

The disclosure also provides an electronic device comprising an enclosure including a housing member defining a side surface of the electronic device and a rear cover assembly coupled to the housing member and including a rear member. The rear member comprises a first glass component defining a base region of an exterior surface of the rear member and a first portion of a hole extending through the rear member. The rear member further comprises a second glass component bonded to the first glass component and defining a second portion of the hole extending through the rear member and a top surface of a protruding feature extending from the base region of the exterior surface, the top surface defining an opening of the hole. The electronic device further comprises a camera assembly coupled to the rear cover assembly and comprising a camera module positioned in the first and the second portions of the hole.

The disclosure further provides an electronic device comprising an enclosure and a sensor assembly. The enclosure comprises a rear glass member comprising a first glass piece and a second glass piece. The first glass piece defines a base region of an exterior surface of the rear glass member and a first portion of a protruding feature, the first portion extending from the base region. The second glass piece is fused to the first glass piece and defines a second portion of the protruding feature, the second portion defining a plateau region of the protruding feature. The sensor assembly is coupled to an interior surface of the rear glass member and comprises a sensor.

BRIEF DESCRIPTION OF THE DRAWINGS

The disclosure will be readily understood by the following detailed description in conjunction with the accompanying drawings, wherein like reference numerals designate like elements.

Figure 1A:
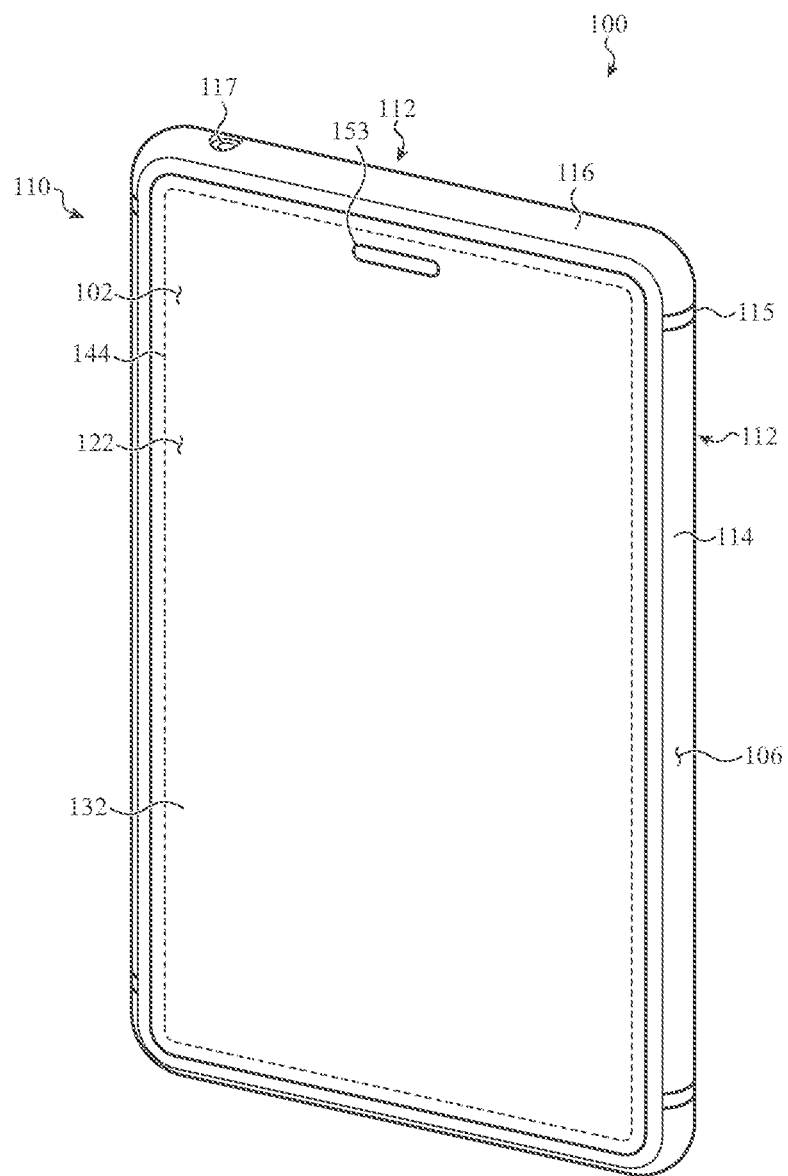
FIG. 1A shows a front view of an example electronic device including a member formed from multiple layers.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

The following disclosure relates to members for electronic devices. In some cases, the member defines a protruding feature that is offset with respect to an adjacent portion of the member. As an example, the member may be part of a rear cover assembly and the protruding feature may be provided over a camera assembly and/or a sensor assembly. One or more openings may be provided in the protruding feature to facilitate positioning of an optical module such as a camera module in the opening(s). In some cases, the member is a glass member. In additional cases, the member includes a glass layer bonded to another layer such as a ceramic or glass ceramic layer.

In some cases, a portion of the member that includes the protruding feature is thicker than an adjacent portion of the member. As described herein, a thicker portion of a member may be produced by joining multiple sheets or layers together. Forming the thicker portion of a glass member by layering multiple pieces of glass, rather than by using a single piece of glass, can reduce the amount of machining needed to produce the desired shape and/or surface texture of the protruding feature.

In some examples, the thicker portion of the glass member is formed from two or more glass layers that are bonded (e.g., by fusion) together. As described herein, the process of fusion bonding the glass layers can produce a glass member that is resistant to damage due to impact and/or bending of the glass member in use. In addition, the glass members described herein can have a strength sufficient to withstand the machining operations used to produce the desired shape of the glass member.

In some cases, the glass member may comprise a layer structure and distinct bond region(s) joining the glass layers. For example, the thicker portion of the glass member (including the protruding feature) may comprise two or more glass layers while the surrounding portion may comprise a single glass layer. A first glass layer may extend substantially across the length and width of the glass member and define the surrounding portion. A second glass layer having smaller lateral dimensions may at least partially define the protruding feature. The two or more glass layers may be fused together or otherwise coupled to produce a strong bond between the glass layers.

In additional cases, the glass member is formed from two or more glass layers that fuse together so completely that a distinct fusion zone may be difficult to detect upon visual inspection (but may be detectable in other ways). For example, the glass member may include a first glass component (alternately, first glass portion) extending substantially across the glass member and formed from a first glass layer. The glass member may also include a second glass component (alternately, second glass portion) at least partially defining the protruding feature and formed from a second glass layer. The second glass component partially overlies the first glass component, which typically has larger lateral dimensions. In some examples, the protruding feature is defined by the first glass component in addition to the second glass component, as described herein with respect to FIGS. 7 to 9. As discussed in more detail below, one or more fusion artifacts may be detected even when a distinct fusion zone or planar boundary between the first and the second glass components may not be visually apparent.

In some cases, a composition of each of the glass layers may be substantially the same. Including glass layers with similar compositions in the glass member can enhance fusion between adjacent glass layers. The glass member may be chemically strengthened to enhance its resistance to impact and/or bending. When the glass member is chemically strengthened, zones of the glass layers that have not been ion-exchanged may have substantially the same composition, as discussed in more detail with respect to FIG. 17.

A member as described herein may have one or more textured regions configured to provide certain properties while minimizing other properties that are less desirable. For example, a textured region may be configured to have roughness parameters that provide particular levels of optical properties such as gloss and/or transmissive haze, while avoiding an overly rough or sharp "feel." The texture may provide a balance of functionality. For example, increasing the value of a roughness parameter to reduce the gloss or increase the haziness of the surface may, in some cases, provide an overly rough "feel" and/or undesirably reduce the cleanability of the surface. In some cases, different regions of the member may have different textures in order to provide different properties to the different regions.

Figure 10:
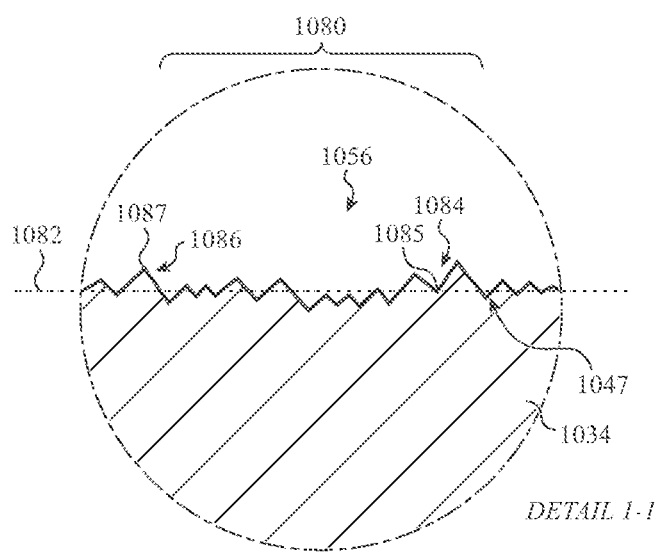
FIG. 10 shows a detail view of a textured region of a member.

For example, the protruding feature may define a textured region and another portion of the member may define another textured region having different properties than that of the protruding feature. In some cases, a top surface of the protruding feature may have a texture which is different from a texture of the rest of the exterior surface (e.g., the remainder of the exterior surface of the member). The properties of a textured region of a member typically influence the properties of a corresponding region of a cover assembly including the member. For example, a low gloss region of the member can produce a corresponding low gloss region of the cover assembly. The description of texture parameters and properties provided with respect to FIG. 10 is generally applicable herein and, for brevity, is not repeated here.

These and other embodiments are discussed below with reference to FIGS. 1A to 18. However, those skilled in the art will readily appreciate that the detailed description given herein with respect to these figures is for explanatory purposes only and should not be construed as limiting.

FIG. 1A shows a front view of an example electronic device 100 including a member as described herein. The electronic device 100 may be a mobile telephone (also referred to as a mobile phone). In additional embodiments, the electronic device 100 may be a notebook computing device (e.g., a notebook or laptop), a tablet computing device (e.g., a tablet), a portable media player, a wearable device (e.g., a watch), or another type of portable electronic device. The electronic device 100 may also be a desktop computer system, computer component, input device, appliance, or virtually any other type of electronic product or device component.

As shown in FIG. 1A, the electronic device 100 has an enclosure 110 including a cover assembly 122. The cover assembly 122 may at least partially define a front surface 102 of the electronic device 100. In this example the cover assembly 122 defines a substantial entirety of a front surface of the electronic device 100. The cover assembly 122 is positioned over the display 144 and may define a transparent portion positioned over the display 144. The enclosure 110 may at least partially surround the display 144. It should be understood that use of the terms "front" or "rear" to describe an orientation of an electronic device in the drawings does not imply that the electronic device must be operated in a specific orientation.

As shown in FIG. 1A, the enclosure 110 further includes a housing member 112 (which may also be referred to simply as a housing or a housing component). The cover assembly 122 may be coupled to the housing member 112. For example, the cover assembly 122 may be coupled to the housing member 112 with an adhesive, a fastener, an engagement feature, or a combination thereof.

The housing member 112 may at least partially define a side surface 106 of the electronic device 100 and may include one or more metal members (e.g., one or more metal segments) or one or more glass members. In this example, the housing member 112 defines all four sides or a continuous side surface of the electronic device 100. As shown in FIG. 1A, the housing member 112 is formed from a series of metal segments (114, 116) that are separated by polymer or dielectric segments 115 that provide electrical isolation between adjacent metal segments. For example, a polymer segment 115 may be provided between a pair of adjacent metal segments. One or more of the metal segments (114, 116) may be coupled to internal circuitry of the electronic device 100 and may function as an antenna for sending and receiving wireless communication.

The housing member 112 may define one or more openings or ports. As shown in FIG. 1A, the metal segment 116 of the housing member 112 defines an opening 117. The opening 117 may allow (audio) input or output from a device component such as a microphone or speaker or may contain an electrical port or connection.

A cover assembly such as the cover assembly 122 typically includes a cover member 132, also referred to herein simply as a member. As shown in FIG. 1A, the cover assembly 122 is a front cover assembly and the member 132 is a front member. In some cases, a cover assembly may be formed from multiple layers. For example, a front cover assembly may include one or more glass layers, glass ceramic layers, polymer layers, and/or various coatings and layers. As an example, a cover assembly may include one or more glass layers defining a (cover) member and one or more coatings on the exterior surface and/or interior surface of the member. In some cases, the member 132 may be a glass member. In additional cases, the member 132 may be a composite member formed by bonding a glass layer to a layer of a glass ceramic material or a layer of a ceramic material, such as sapphire. In some cases, the glass ceramic material or ceramic material may be transparent to visible light, infrared radiation, ultraviolet radiation, or combinations thereof.

Typical cover assemblies herein are thin, and typically include a cover member that is less than 5 mm in thickness, and more typically less than 3 mm in thickness. In some aspects, a member of a cover assembly, such as the members 132 and 134, can have a thickness from about 0.1 mm to 2 mm, from about 0.3 mm to 3 mm, from 0.5 mm to 2.5 mm, from 0.5 mm to 2 mm, or from 0.2 mm to 1 mm. In some cases, a member and a cover assembly including the member may have a non-uniform thickness, such as described in further detail below with respect to the member 134 and the rear cover assembly 124. A member such as the members 132 and 134 may extend laterally across the cover assembly, such as substantially across the width and the length of the cover assembly.

Although the cover assembly 122 is shown in FIG. 1A as being substantially planar, the principles described herein also relate to cover assemblies and members thereof that define a protruding feature (such as shown in FIGS. 1B, 2-9, 12C, 13C, 14C, 15C, and 17), a recessed feature, and/or one or more curved surfaces. In embodiments, a member of a cover assembly may be three-dimensional or define a contoured profile. For example, the member may define a peripheral portion that is not coplanar with respect to a central portion. The peripheral portion may, for example, define a side wall of a device housing or enclosure, while the central portion defines a front surface (which may define a transparent window that overlies a display). In addition, a cover assembly such as the cover assembly 122 may define a hole, such as the hole 153, to allow (audio) input or output from a device component such as a microphone or speaker.

Figure 1B:
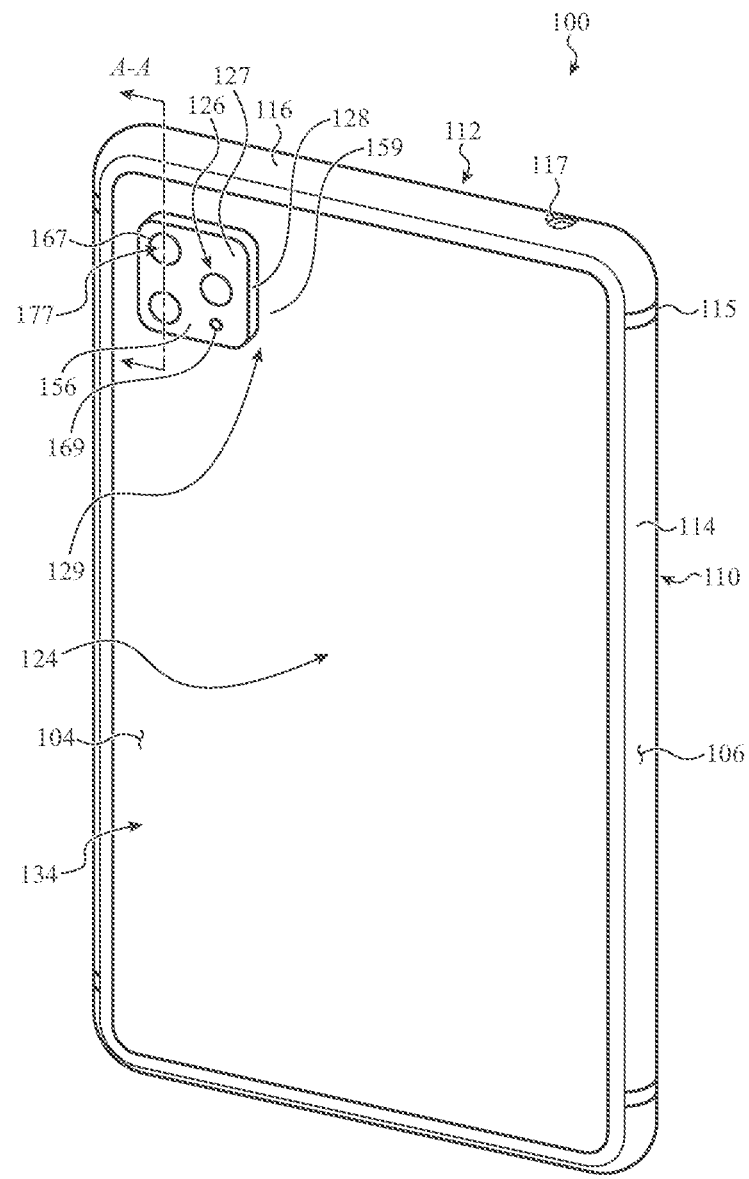
FIG. 1B shows a rear view of the electronic device of FIG. 1A.

FIG. 1B shows a rear view of the electronic device 100. As shown in FIG. 1B, the enclosure 110 includes a cover assembly 124, which defines a rear surface 104 of the electronic device. In the example of FIG. 1B, the cover assembly 124 defines a substantial entirety of the rear surface of the electronic device. In some cases, the electronic device 100 includes a camera assembly and/or a sensor assembly coupled to an interior surface of the cover assembly 124 (as shown in FIGS. 2 to 5).

The cover assembly 124 includes a cover member 134 also referred to herein simply as a member. As shown in FIG. 1B, the cover assembly 124 is a rear cover assembly and the member 134 is a rear member. In some cases, the member 134 is a glass member. As described in greater detail below, in some cases at least a portion of a glass member is formed from two or more glass layers that are bonded (e.g., fusion bonded) together. The cover assembly 124 may further include a smudge-resistant coating, a cosmetic coating, or a combination thereof.

As shown in FIG. 1B, the cover assembly 124 defines a feature 126 that protrudes or is offset with respect to a portion 129 of the cover assembly 124. The feature 126 may also be referred to herein as a protruding feature. The portion 129 may also be referred to herein as a base portion and may define a base region of the exterior surface of the cover assembly 124. The portion 129 may be adjacent to the protruding feature and may at least partially surround the protruding feature.

Figure 2:
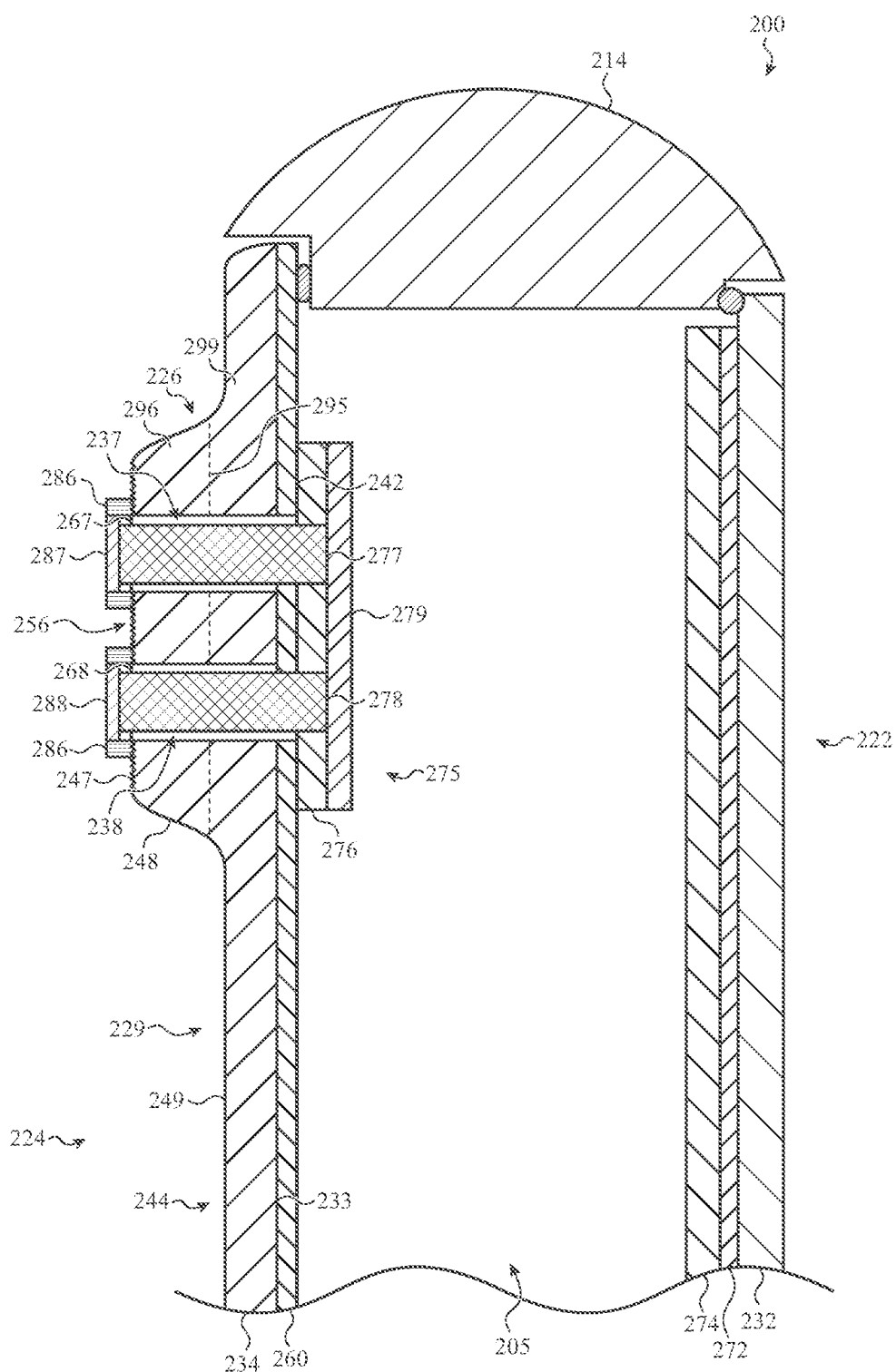
FIG. 2 shows a partial cross-section view of an electronic device including an example rear cover assembly and a camera assembly.
Figure 3:
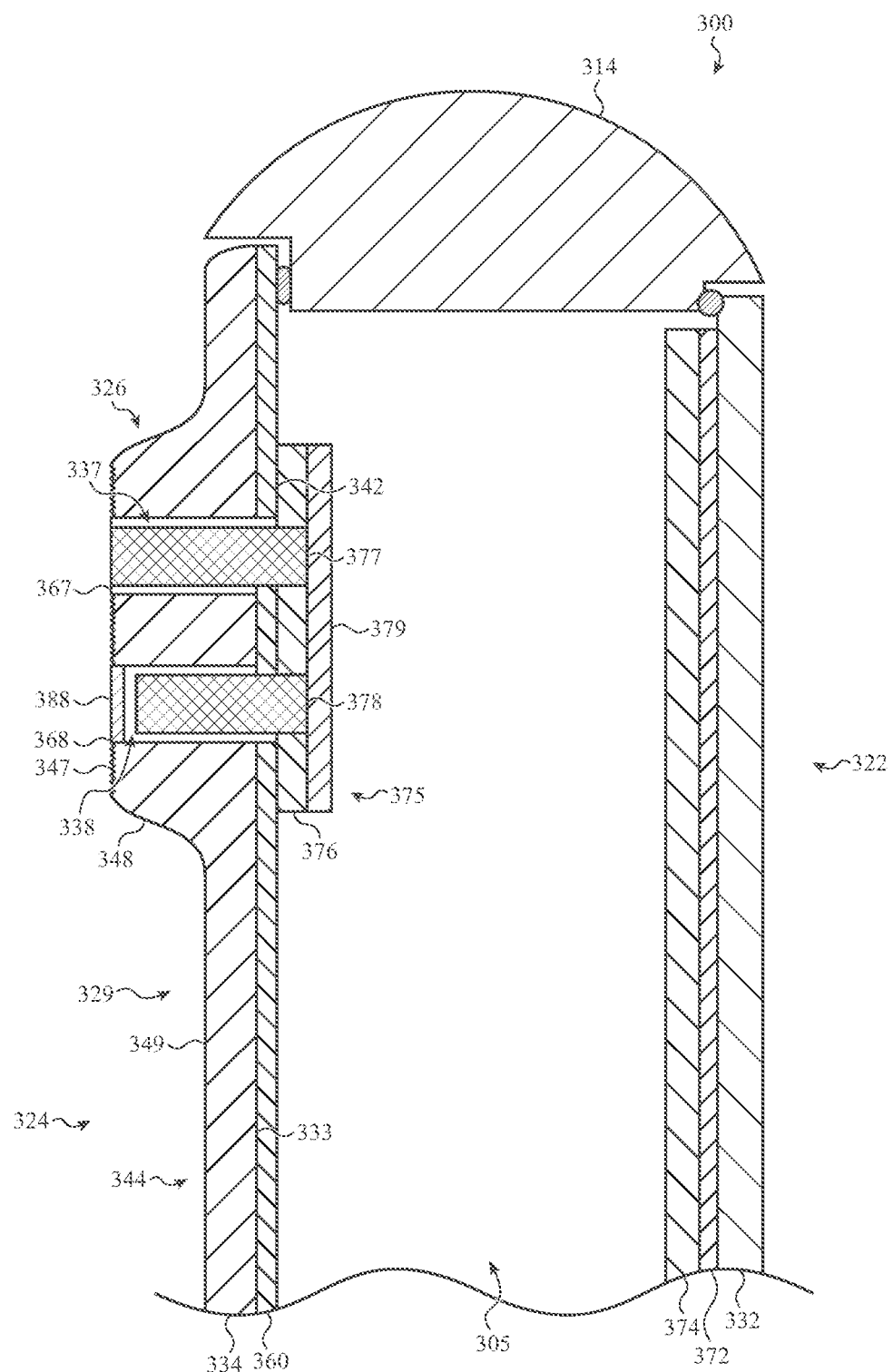
FIG. 3 shows a partial cross-section view of an electronic device including an additional example rear cover assembly and a camera assembly.
Figure 4:
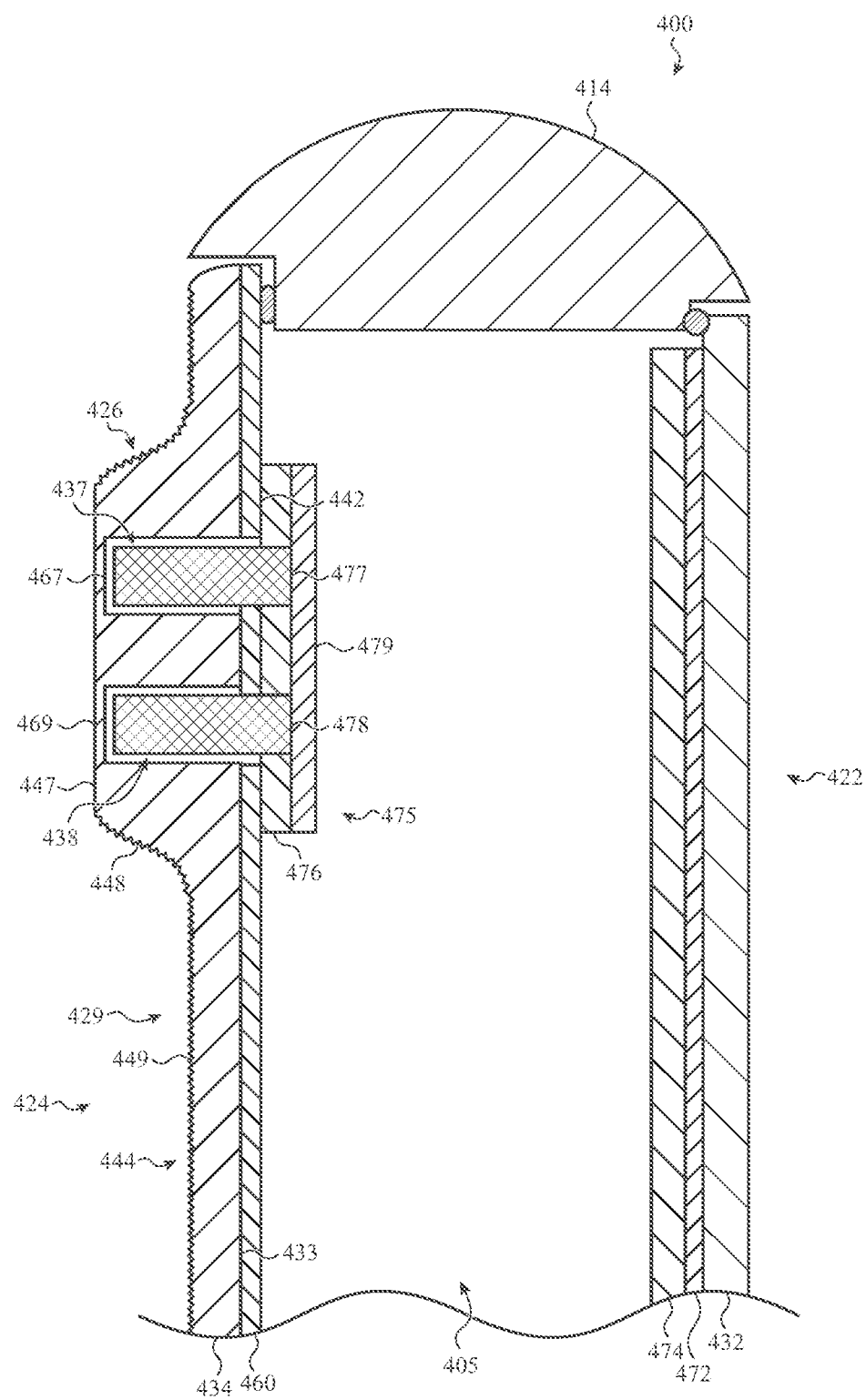
FIG. 4 shows a partial cross-section view of an electronic device including a further example rear cover assembly and a camera assembly.

As shown in FIG. 1B, an exterior surface of the protruding feature 126 defines a raised region 127. The raised region 127 may define a top or outermost surface of the protruding feature 126. In the example of FIG. 1B, the raised region 127 generally defines a plateau and the exterior surface of the protruding feature 126 further defines a side region 128 (also referred to herein as a side surface). The side region 128 extends between the raised region 127 and the exterior surface of the base portion 129. In the example of FIG. 1B, the protruding feature 126 further defines a set of openings 167 in the raised region 127. An opening 167 may correspond to the entrance to (or exit from) a hole (also referred to herein as a through-hole) that extends through the cover assembly from the raised region 127 to an interior surface of the cover assembly. The description of through-holes provided with respect to FIGS. 2 to 4 is generally applicable herein and, for brevity, is not repeated here.

The combined thickness of a portion of the cover assembly 124 including the protruding feature 126 may be greater than that of the portion 129 and may be at least 10%, 25%, or 50% and up to about 250% thicker than the thickness of the portion 129. In some cases, the thickness of the thicker portion of the cover assembly (including the protruding feature) is greater than about 1 mm and less than or equal to about 2 mm or about 2.5 mm. The thickness of the base portion 129 may be greater than about 0.3 mm and less than about 0.75 mm or greater than about 0.5 mm and less than about 1 mm. The amount of protrusion or offset between the raised region 127 and an exterior surface of the portion 129 may be from about 0.5 mm to about 1.5 mm or from about 0.75 mm to about 2 mm. The size of the protruding feature 126 may depend at least in part on the size of a camera assembly or other device component underlying the protruding feature. In some embodiments, a lateral dimension (e.g., a width) of the protruding feature may be from about 5 mm to about 30 mm, from about 10 mm to about 20 mm, or from about 15 mm to 30 mm.

The shape of the member 134 may generally correspond to the shape of the cover assembly 124. Typically, the member 134 also includes a feature that protrudes with respect to a base region of the exterior surface of the member as shown in more detail in the cross-section views of FIGS. 2 to 9 (e.g., the protruding feature 636 of FIG. 6). A portion of a member including the protruding feature may be thicker than an adjacent portion of the member. In some cases, the thicker portion of a glass member is formed from a greater number of glass layers than the surrounding portion of the glass member, as described in further detail with respect to at least FIGS. 6 to 9 and 11 through 15C. The description provided with respect to FIGS. 6 to 9 and 11 through 15C is generally applicable herein and, for brevity, is not repeated here. The member 134 may extend across a substantial entirety of the rear of the electronic device 100. More generally, a member having a protruding feature may extend across a front, a rear, and/or a side surface of the electronic device and in some cases may extend over less than an entirety of one or more of these surfaces.

The protruding feature 126 may define a textured region 156 of the electronic device 100. The textured region 156 may have a texture configured to provide a desired appearance to an exterior surface of the electronic device 100. In addition, the texture of the textured region 156 may be configured to provide a particular "feel" to the electronic device, configured to be amenable to cleaning, or both. In some cases, the textured region 156 may extend over both the raised region 127 and the side region 128. In other cases, the textured region 156 may extend over a raised region 127 but may not substantially extend over the side region 128.

In some cases, the textured region 156 has at least one roughness parameter greater than that of a polished surface, such as a conventionally polished surface. For example, the textured region 156 may have a texture that produces a matte appearance (e.g., a semi-gloss or a low gloss appearance). In addition, the textured region 156 may have a texture that produces an at least partially translucent or hazy appearance. In other cases, the textured region 156 has at least one roughness parameter similar to that of a polished surface. The description of textures provided with respect to FIG. 10 is generally applicable herein and, for brevity, is not repeated here.

The texture of the textured region 156 may be similar to or different from that of another portion of the cover assembly. For example, the base portion 129 may define a textured region 159 and the texture of the textured region 156 may be different from a texture of the textured region 159. In addition, when the textured region 156 does not extend over the side region 128, a texture of the side region 128 may be similar to the texture of the textured region 159.

In some cases, the textured region 156 has at least one roughness parameter greater than that of a polished surface, such as a conventionally polished surface, and the textured region 159 has a texture similar to that of a polished surface. In such cases, the textured region 156 may have a lower gloss than the textured region 159. In other cases, the textured region 156 has a roughness parameter similar to that of a polished surface and the textured region 159 has a texture greater than that of a polished surface. Methods for forming textures on the member 134 of the cover assembly 124 are discussed with respect to FIG. 11 and those details are generally applicable herein.

The electronic device 100 may include a camera assembly. The camera assembly may include one or more optical modules. The example of FIG. 1B shows three optical modules 177, but more generally the camera assembly may define any number of optical modules 177, such as one, two, three, four, or five optical modules. Each of the optical modules 177 may be substantially flush with, proud of (alternately, protrudes), or recessed with respect to the textured region 156. In some cases, the camera assembly may be part of a sensor array.

The optical modules 177 may include, but are not limited to, a camera module, an illumination module, a sensor, and combinations thereof. In some cases, the optical modules 177 include multiple camera modules. When the optical modules include multiple camera modules, each of the camera modules may have a different field of view or other optical property. In some cases, a camera module includes an optical sensing array and/or an optical component such as a lens, filter, or window. In additional cases, a camera module includes an optical sensing array, an optical component, and a camera module housing surrounding the optical sensing array and the optical components. The camera module may also include a focusing assembly. For example, a focusing assembly may include an actuator for moving a lens of the camera module. In some cases, the optical sensing array may be a complementary metal-oxide semiconductor (CMOS) array or the like. In some cases, a sensor may include a depth measuring sensor (e.g., a time of flight sensor), an ambient light sensor, an infrared sensor, an ultraviolet light sensor, a health monitoring sensor, a biometric sensor (e.g., a fingerprint sensor), or the like.

An optical module 177 may be positioned at least partially within an opening 167 in the textured region 156, as shown in FIG. 1B. The optical module 177 may also be positioned at least partially within a through-hole in the cover assembly 124 (as shown in the partial cross-section views of FIGS. 2 to 4). The camera assembly may be coupled to an interior surface of the cover assembly as shown in FIGS. 2 to 4.

In additional cases, a protruding feature 126 of the electronic device 100 can accommodate one or more sensor components in addition to or as an alternate to the optical modules of the camera assembly. For example, the electronic device may include an electronic device component such as a microphone or another type of sensor. These one or more sensor components may be part of a sensor assembly. The sensor assembly may in turn be part of a sensor array.

Figure 5:
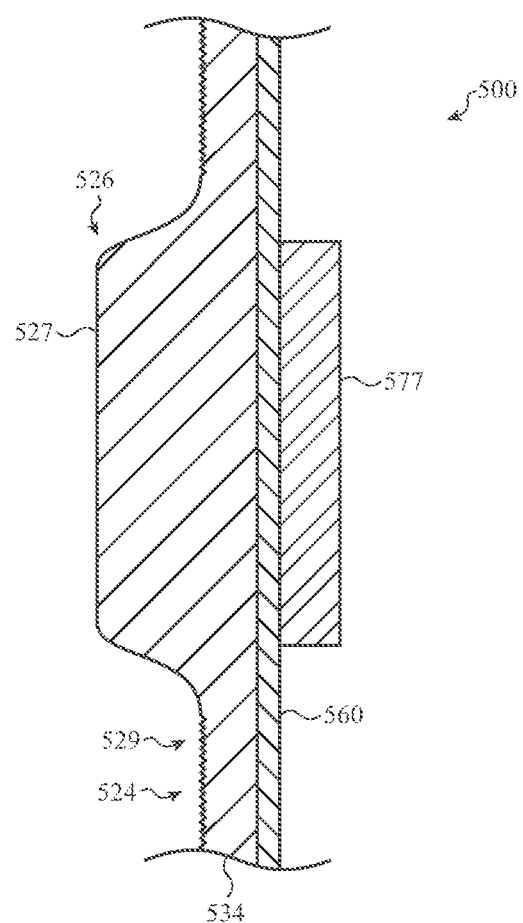
FIG. 5 shows a partial cross-section view of an electronic device including a rear cover assembly and a sensor assembly.
Figure 18:
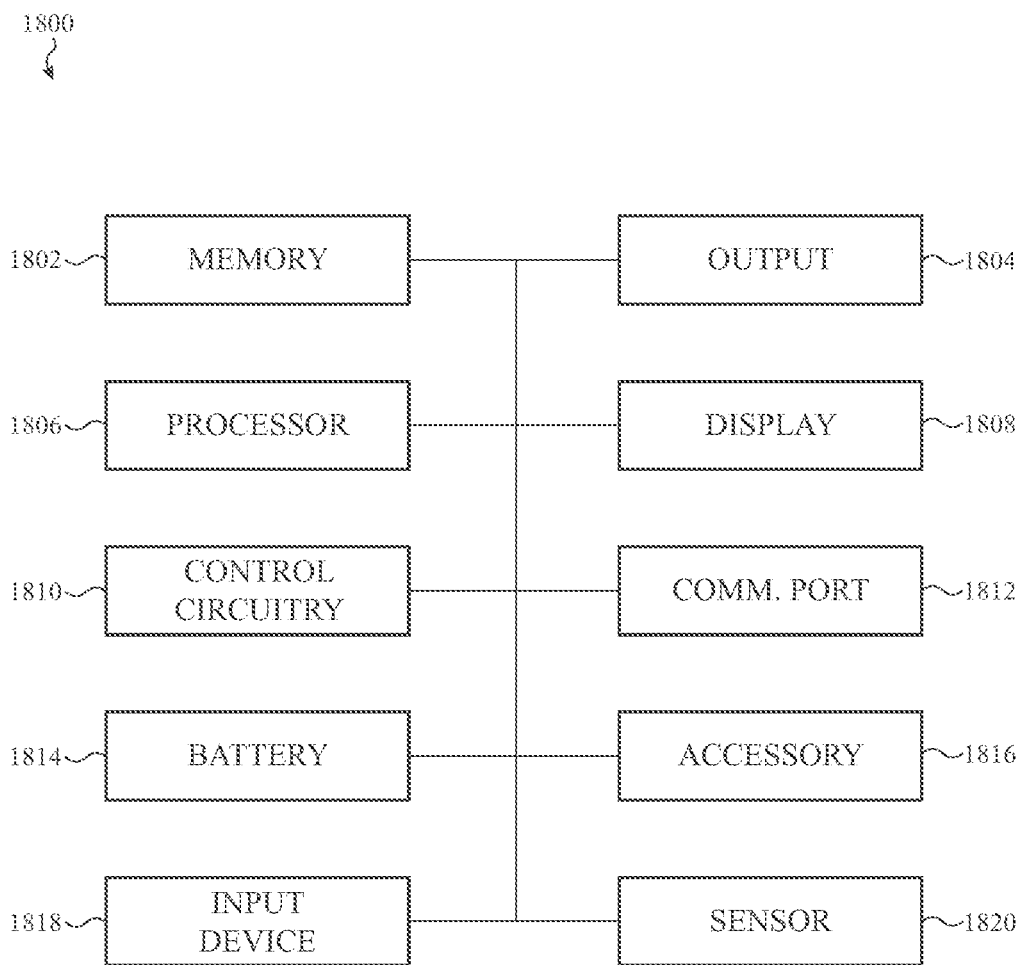
FIG. 18 shows a block diagram of a sample electronic device that can incorporate a member.

A variety of sensors may be positioned within and/or adjacent to a protruding feature. For example, a health monitoring sensor may be positioned at least partially within or adjacent to a protruding feature of a wearable device, such as a watch. As another example, a protruding feature may define a key region, a button region, or a trackpad region of a laptop or a phone. A biometric sensor, a touch sensor, a proximity sensor, or the like may be positioned within or adjacent to the protruding feature. The description of sensors provided with respect to FIG. 18 is generally applicable herein and, for brevity, is not repeated here. In some cases, the protruding feature includes an opening, such as opening 169 of FIG. 1B, and the additional electronic device component is positioned within or below the opening. In additional cases, a sensor assembly may be positioned adjacent to a protruding feature as shown in FIG. 5.

The electronic device 100 may also include components in addition to a display and a camera assembly. These additional components may comprise one or more of a processing unit, control circuitry, memory, an input/output device, a power source (e.g., battery), a charging assembly (e.g., a wireless charging assembly), a network communication interface, an accessory, and a sensor. Components of a sample electronic device are discussed in more detail below with respect to FIG. 18 and the description provided with respect to FIG. 18 is generally applicable herein.

FIG. 2 shows a partial cross-section view of an electronic device 200 including an example rear cover assembly and a camera assembly. The electronic device 200 may be similar to the electronic device 100 of FIGS. 1A and 1B and the cross-section may be taken along A-A. The electronic device 200 includes a cover assembly 222 at the front and a cover assembly 224 at the rear of the electronic device 200. Each of the cover assembly 222 and the cover assembly 224 is coupled to a housing member 214, such as with an adhesive, a fastener, or a combination thereof. The housing member 214 may be similar to the housing member 112 and/or the segments 114 and 116 of the housing member 112 of FIG. 1A. The housing member 214 at least partially defines an interior cavity 205 of the electronic device 200.

The cover assembly 222 includes a member 232 and the cover assembly 224 includes a member 234. The member 234 may be a glass member and in some cases the member 232 may also be a glass member. The cover assembly 224 defines a feature 226 that protrudes with respect to a portion 229 of the cover assembly 224. A feature which protrudes with respect to another portion of the cover assembly, such as the feature 226, may also be referred to generally herein as a protruding feature. Typically, at least part of the portion 229 is substantially adjacent the protruding feature 226. The portion 229 may also be referred to herein as a base portion 229. As shown in FIG. 2, a portion of the cover assembly 224 including the protruding feature 226 and an underlying portion of the cover assembly is thicker than the portion 229. The protruding feature 226 and the underlying portion collectively may be referred to as a thicker portion of the cover assembly 224.

Figure 6:
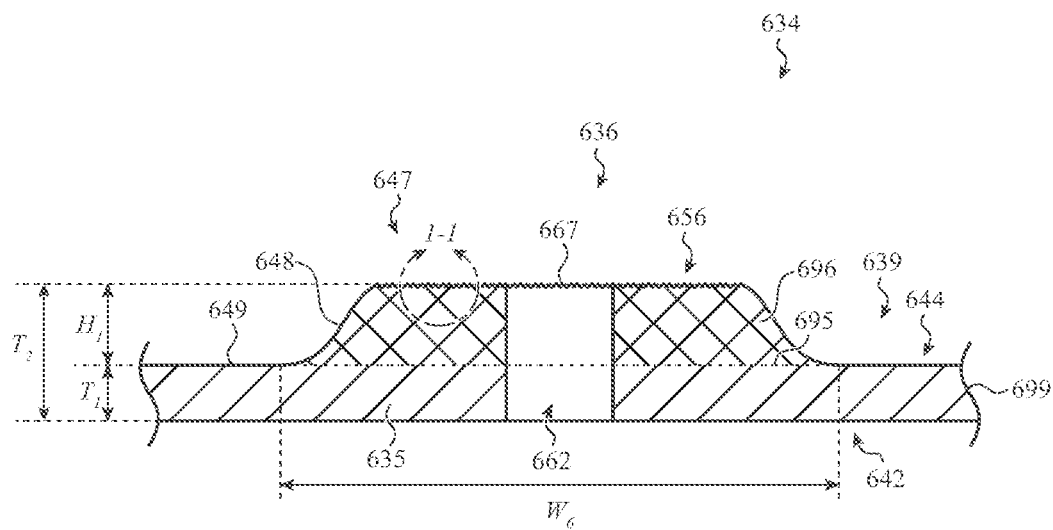
FIG. 6 shows a partial cross-section view of an example member.

The member 234 may also include a protruding feature as shown in more detail in the cross-section views of FIGS. 6 to 9, 12C, 13C, 14C, and 15C (e.g., the protruding feature 636 of FIG. 6). Similarly to the cover assembly 224, the protruding feature of the member 234 may be part of a thicker portion of the member as compared to an adjacent portion of the member 234. In some cases, the thicker portion of a glass member is formed from a greater number of glass layers than the adjacent portion of the glass member, as described in further detail with respect to FIGS. 6 to 9 and 11 to 15C. In some cases, the member 234 is a glass member and includes a first glass component 299 (e.g., formed from a first glass layer), a second glass component 296 (e.g., formed from a second glass layer), and a boundary region 295 between the first and second glass components. The second glass component 296 has a smaller lateral dimension (e.g., a width) than the first glass component 299 and thus only partially overlies the first glass component. The position of the boundary region shown in FIG. 2 is not intended to be limiting and additional examples are shown in FIGS. 6 to 9, 12C, 13C, 14C, and 15C. In some cases, the boundary region 295 may be distinct and readily detected upon visual inspection, while in other cases the boundary region may be detectable in other ways, as described in more detail with respect to at least FIGS. 6 and 11. FIGS. 6 to 9, 12C, 13C, 14C, and 15C also illustrate the portion of the member underlying the protruding feature. The underlying portion of the cover assembly includes this underlying portion of the member as well as any coatings along the interior surface of the member. The description provided with respect to FIGS. 6 to 9 and 11 to 15C is generally applicable herein and, for brevity, is not repeated here.

As shown in FIG. 2, the cover assembly 224 further defines an exterior surface 244. A region 247 of the exterior surface 244 is defined by the protruding feature 226 and a region 249 of the exterior surface 244 is defined by the portion 229. The region 247 of the exterior surface protrudes or is raised with respect to the region 249 and may therefore be referred to as a raised region, an offset region, an outer region, or simply as a top surface of the protruding feature 226. As an example, the raised region 247 of the exterior surface may define a plateau. The region 249 of the exterior surface may be referred to herein as a base region of the exterior surface. A region 248 of the exterior surface 244 may extend between the region 247 and the region 249 of the exterior surface and may define a side surface of the protruding feature 226. As schematically shown in FIG. 2, the region 247 may include a textured region. In the example of FIG. 2, the region 247 has a rougher texture than the regions 248 and 249. The example of FIG. 2 is not limiting and in some cases the region 247 may have a smoother texture than the regions 248 and 249. More generally, the region 247 may have a texture similar to or different from that of another region of the exterior surface as previously described with respect to FIG. 1B. The description with respect to FIG. 1B is generally applicable herein and, for brevity, is not repeated here.

The electronic device 200 further includes a display 274 and a touch sensor 272 provided below the front cover assembly 222. The display 274 and the touch sensor 272 may be coupled to the front cover assembly 222. The display 274 may be a liquid-crystal display (LCD), a light-emitting diode (LED) display, an LED-backlit LCD display, an organic light-emitting diode (OLED) display, an active layer organic light-emitting diode (AMOLED) display, and the like. The touch sensor 272 may be configured to detect or measure a location of a touch along the exterior surface of the front cover assembly 222.

The electronic device 200 further includes a camera assembly 275. The partial cross-section view of FIG. 2 shows two optical modules (277, 278) of the camera assembly 275. As shown in FIG. 2, the camera assembly 275 is coupled to the cosmetic coating 260. In examples where the cosmetic coating does not extend under the protruding feature, the camera assembly 275 may be coupled more directly to the interior surface of the member 234. In some cases, the camera assembly 275 may be coupled to the interior surface 242 of the cover assembly 224 with an adhesive bond, as may be provided by an adhesive layer. As an additional example, the camera assembly 275 may be coupled to the interior surface of the cover assembly 224 with a fastener or other form of mechanical attachment.

The camera assembly 275 further includes a support structure 276 that is coupled to an interior surface 242 of the cover assembly 224. The support structure 276 may be configured to hold various elements of the camera assembly 275 in place. For example, each of the optical modules 277 and 278 and a circuit assembly 279 may be mounted to the support structure 276. In some cases, the support structure 276 may include a plate, a bracket, or a combination thereof. The shape of the support structure 276 is not limited to the example of FIG. 2. While the support structure 276 is shown as a flat element, in other examples a support structure may be machined, cast, or molded to have a non-planar profile that is configured to receive elements of the camera assembly. The circuit assembly 279 may include a printed circuit board (PCB).

The support structure 276 and the coupling between the camera assembly 275 and the interior surface of the cover assembly 224 may be configured to limit bending of the member 234 in the vicinity of the protruding portion 226. For example, the support structure 276 may be configured to limit bending that would tend to increase outwards curvature of the region 247 of the protruding portion 226 (and increase its convexity). Limiting bending of the protruding region can limit bending-induced tensile stress along the textured region 256. Further, the coupling between the camera assembly 275 and the interior surface 242 of the cover assembly 224 may be sufficiently rigid so that the position of a neutral axis of the combination of the cover assembly 224 and the camera assembly 275 is shifted as compared to the corresponding neutral axis of the cover assembly 224 alone. For example, the neutral axis of the combination of the cover assembly 224 and the camera assembly 275 may be shifted inward, away from the exterior surface 244, as compared to the corresponding neutral axis of the cover assembly 224 alone. In some cases, the shifting of the neutral axis may be most pronounced in the protruding feature 226 of the cover assembly 224.

As previously described with respect to FIG. 1B, the cover assembly 224 may define holes 237 and 238 extending through the protruding portion 226. Holes 237 and 238 may also be referred to herein as through-holes. As shown in FIG. 2, the member 234 also at least partially defines the holes 237 and 238. The cover assembly 224 further defines openings 267 and 268 to the holes 237 and 238. The openings 267 and 268 are located in the region 247, which may be a textured region.

The first optical module 277 and the second optical module 278 are respectively aligned with the through-holes 237 and 238. As shown in FIG. 2, the first optical module 277 extends substantially through the first through-hole 237 and the second optical module 278 extends substantially through the second through-hole 238. In the example of FIG. 2, an end of each of the optical modules 277 and 278 extends beyond (protrudes beyond) the opening (267 or 268) in the surface region 247. In additional examples, an end of an optical module may be flush with an opening in a surface region of the protruding feature or recessed with respect to this surface region, as shown in FIGS. 3 and 4. In some cases, an electronic device may include at least one optical module that is flush with or extends beyond an opening in the surface region 247 and another optical module that is recessed with respect to the surface region 247.

As previously described with respect to FIG. 1B, an optical module may comprise a camera module, an illumination module, an optical sensor, or the like. Typically, the camera assembly 275 includes at least one camera module and may include two, three, four or five camera modules. The camera module is electrically connected to the circuit assembly 279. As shown in FIG. 2, separate windows 287 and 288 are provided over the through-holes 237 and 238 and retaining component 286 holds the windows 287 and 288 in place. For example, the retaining component 286 may be a ring, such as a metal ring, which surrounds the end of the optical module. Alternately, an optical module may include a window as part of its optical components, with the window being positioned within its housing. The windows may protect underlying components (e.g., cameras, lenses, other sensors), and may define part of the exterior surface of the cover assembly.

The cover assembly 224 further includes a cosmetic or decorative coating 260 disposed along an interior surface 233 of the member 234. In some cases, the cosmetic coating 260 may define an interior surface 242 of the cover assembly. When the cover assembly and member over the cosmetic coating are textured, the appearance of the electronic device may be due to the combined effect of the textured region and the cosmetic coating. As shown in FIG. 2, the cosmetic coating 260 is positioned underneath the portion 229 of the cover assembly 224 and in some cases may provide the portion 229 with a desired color. In additional cases, the cosmetic coating 260 may function as a masking layer. In the example of FIG. 2, the cosmetic coating 260 extends under the protruding feature 226 and the protruding feature 226 may have a color similar to the portion 229. In other cases, the cosmetic coating may not extend under the protruding feature 226 and the protruding feature 226 may appear to have a color different from the portion 229 or may appear substantially colorless. For example, the absolute value of each of a* and b* may be less than 5, less than 3, or less than or equal to 2 and the value of L* may be greater than 90, greater than 95, or greater than 98 when the protruding feature appears substantially colorless.

In some cases, the cosmetic coating 260 comprises a polymer. The cosmetic coating 260 may comprise at least 40%, 50%, 60%, or 70% of the polymer and may therefore be referred to as a polymer-based coating or a polymeric coating. When the cosmetic coating 260 further comprises a colorant, the polymer may act as a binder for the colorant. The colorant (e.g., a pigment) may be substantially dispersed in a matrix of the polymer. As examples, the polymer may be polyester-based, epoxy-based, urethane-based, or based on another suitable type of polymer or copolymer. The cosmetic coating 260 may further comprise optional additives such as one or more extenders, diluents, polymerization initiators, and/or stabilizers. In some embodiments, the polymer has a cross-linked structure.

In some cases, the cosmetic coating may include a color layer (e.g., an ink, dye, paint, etc.) and/or a metal layer. As previously described, the cosmetic coating 260 may include at least one color layer. The color layer may comprise a polymer and a colorant dispersed in the polymer and may be transparent, translucent, or opaque. More generally, any pigment, paint, ink, dye, sheet, film, or other layer may be used as the cosmetic coating 260 or a portion thereof. In some embodiments, the cosmetic coating 260 is a multilayer coating that includes a first color layer and a second color layer. Each of the color layers may be transparent, translucent, or opaque. Each of the color layers may include the same colorant or different color layers may include different colorants. The thickness of each of the color layers in the cosmetic coating 260 may be from about 2 microns to about 10 microns.

The color layer(s) and the cosmetic coating 260 may have a chromatic color or an achromatic color. The color of the cosmetic coating 260 may be characterized using a color model. For example, in the hue-saturation-value (HSV) color model, the hue relates to the wavelength(s) of visible light observed when the color feature is viewed (e.g., blue or magenta) and the value relates to the lightness or darkness of a color. The saturation relates to the perceived colorfulness as judged in proportion to its brightness. As another example, coordinates in CIEL*a*b* (CIELAB) color space may be used to characterize the color, wherein L* represents brightness, a* the position between red/magenta and green, and b* the position between yellow and blue.

In some cases, the cosmetic coating 260 may include multiple layers. As examples, the cosmetic coating 260 may include one or more color layers, a metal layer, an optically clear layer, an optically dense layer, and combinations thereof. In additional cases, the cosmetic coating need not include a color layer, but may include one or more of an optically dense layer and a metal layer.

For example, the cosmetic coating 260 may include an optically dense layer. The optically dense layer may substantially reduce or prevent transmission of visible light, thereby "blocking" the view through the cover assembly 224 of components positioned behind the optically dense layer. In addition, the optical properties of the optically dense layer may be configured to adjust the lightness and/or the chroma of the cosmetic coating 260.

For example, the optical density of the optically dense layer may be described by $OD=\log_{10}$ (initial intensity/transmitted intensity) and may be greater than or equal to 1, greater than or equal to 2, or greater than or equal to 3. Generally, the optically dense layer comprises a polymer. The optically dense layer may further comprise one or more pigments, dyes, or a combination thereof. As an example, the optically dense layer has a substantially wavelength independent (neutral) reflectance and/or absorption spectrum over the visible range. In addition, the optically dense layer may have an achromatic characteristic color. The thickness of the optically dense layer may be from about 2 microns to about 10 microns.

In further embodiments, the cosmetic coating 260 may comprise a metal layer in addition to one or more color layers. Such a metal layer may give a metallic effect to the cosmetic coating as seen through the cover assembly 224. When used to form a metallic marking, the metal layer may be a partial layer (e.g., having a smaller lateral dimension than a color layer). For example, the metal of the layer may be selected from aluminum, copper, nickel, silver, gold, platinum, and alloys thereof. In some cases, the metal layer may be configured to at least partially transmit visible light. For example, the metal layer may have a thickness greater than about 0.5 nm and less than 10 nm, less than 5 nm, less than 3 nm, less than 2 nm, or less than 1 nm. Thicker metal layers may be used for forming an indicium or another marking under the member. The marking may be in the form of an image, a pattern, text, a glyph, a symbol, indicia, a geometric shape, or a combination thereof.

The metal layer may be disposed along an interior surface of the member 234. In some cases, the metal layer may be used in combination with an optically clear layer. The optically clear layer may have one or more mechanical properties (e.g., modulus, hardness and/or toughness) that limit or prevent propagation of cracks from the metal layer into the member 234. The optically clear layer may be a polymeric layer and may have a thickness from about 1 micron to about 5 microns. The optically clear layer may be disposed along the interior surface 233 of the member 234, the metal layer may be positioned between the optically clear layer and the optically dense layer, a first color layer may be positioned between the metal layer and the optically dense layer, and a second color layer may be positioned between the first color layer and the optically dense layer.

In addition, the cosmetic coating may comprise additional polymeric layers behind and disposed along the optically dense layer. If components of the electronic device are glued to the cosmetic coating, these additional layers may include a protective layer that protects the color layers of the multilayer coating from damage due to the glue. The additional layers may further include a layer inward of the protective layer that facilitates adhesion of the cosmetic coating to the glue.

FIG. 3 shows a partial cross-section view of an electronic device 300 including an additional example rear cover assembly and a camera assembly. The electronic device 300 may be similar to the electronic device 100 of FIGS. 1A and 1B and the cross-section may be taken along A-A. The electronic device 300 includes a cover assembly 322 at the front and a cover assembly 324 at the rear of the electronic device 300. Each of the cover assembly 322 and the cover assembly 324 is coupled to a housing member 314, such as with an adhesive, a fastener, or a combination thereof. The housing member 314 may be similar to the housing member 112 and/or the segments 114 and 116 of the housing member 112 of FIG. 1A. The housing member 314 at least partially defines an interior cavity 305 of the electronic device 300.

The cover assembly 322 includes a member 332 and the cover assembly 324 includes a member 334. The member 334 may be a glass member and in some cases the member 332 may also be a glass member. The cover assembly 324 defines a protruding feature 326 that protrudes with respect to a base portion 329. Typically, the member 334 also includes a protruding feature as shown in more detail in the cross-section views of FIGS. 6 to 9, 12C, 13C, 14C, and 15C (e.g., the protruding feature 636 of FIG. 6). As previously described with respect to the cover assembly 224, the protruding feature of the member 334 may be part of a thicker portion of the member as compared to an adjacent portion of the member. In some cases, the member 334 is a glass member and the thicker portion of the member 334 is formed from a greater number of glass layers than the adjacent portion of the member, as described in further detail with respect to at least FIGS. 6 to 9 and 11 to 15C. The member 334 may be a glass member comprising a first glass component and a second glass component or may be a composite member as described with respect to FIGS. 1B, 2, 6 to 9, and 11 and that description is not repeated here.

In a similar fashion as described for FIG. 2, the cover assembly 324 defines an exterior surface 344. A region 347 of the exterior surface 344 is defined by the protruding feature 326 and a region 349 of the exterior surface 344 is defined by the base portion 329. As shown in FIG. 3, a region 348 of the exterior surface 344 extends between the region 347 and the region 349 and may define a side surface of the protruding feature 326. The cover assembly 324 may define holes 337 and 338 extending through the protruding feature 326 and defining openings 367 and 368 at an external surface of the protruding feature 326.

In a similar fashion as previously described with respect to FIGS. 1B and 2, the different regions of the exterior surface 344 may have similar textures to each other or may have different textures from each other. In the example of FIG. 3, the regions 349 and 348 have a smoother texture than the region 347. In additional embodiments, the regions 349 and 348 have a rougher texture than the region 347 or the region 348 may have a texture similar to that of the region 349 and/or the region 347. Further, the discussion of surface textures provided with respect to FIGS. 1B and 2 is applicable herein but, for brevity, is not repeated here.

The electronic device 300 further includes a display 374 and a touch sensor 372 provided below the front cover assembly 322. The display 374 and the touch sensor 372 may be as previously described for FIG. 2 and, for brevity, that description is not repeated here.

The electronic device 300 further includes a camera assembly 375. The partial cross-section view of FIG. 3 shows optical modules 377 and 378 of the camera assembly 375. The camera assembly 375 further includes a support structure 376 that is coupled to an interior of the cover assembly 324. As shown in FIG. 3, the decorative coating 360 is disposed along an interior surface 333 of the member 334 and extends between the support structure 376 and the member 334. The support structure 376 may be coupled to the interior surface 342 through the cosmetic coating in a similar manner as previously described for support structure 276. The support structure 376 may have similar features and functions as support structure 276 and the circuit assembly 379 may have similar features and functions as the circuit assembly 279. The description provided with respect to support structure 276 is generally applicable herein and, for brevity, is not repeated here.

As previously described with respect to FIG. 2, the cover assembly 324 may define holes 337 and 338 extending through the protruding portion 326. The optical module 377 is aligned with the hole 337 and the optical module 378 is aligned with the hole 338. As shown in FIG. 3, the optical module 377 extends substantially through the through-hole 337 and into the opening 367 so that an end of the optical module is flush with the opening and the surface region 347. In contrast, the optical module 378 extends partially through the through-hole 338 and a window 388 is positioned in the opening 368. In some cases, a sealing member may seal the opening around an optical module and/or a window to prevent ingress of liquids and/or contaminants.

The cover assembly 324 further includes a cosmetic or decorative coating 360 disposed along an interior surface 333 of the member 334. As shown in FIG. 3, the cosmetic coating 360 extends between the support structure 376 and the member 334 and the support structure 376 may be coupled to the interior surface 333 through the cosmetic coating in a similar manner as previously described for support structure 276. The cosmetic coating 360 may be as previously described for FIG. 2 and, for brevity, that description is not repeated here.

FIG. 4 shows a partial cross-section view of an electronic device 400 including a further example rear cover assembly and a camera assembly. The electronic device 400 may be similar to the electronic device 100 of FIGS. 1A and 1B and the cross-section may be taken along A-A. The electronic device 400 includes a cover assembly 422 at the front and a cover assembly 424 at the rear of the electronic device 400. Each of the cover assembly 422 and the cover assembly 424 is coupled to a housing member 414, such as with an adhesive, a fastener, or a combination thereof. The housing member 414 may be similar to the housing member 112 and/or the segments 114 and 116 of the housing member 112 of FIG. 1A. The housing member 414 at least partially defines an interior cavity 405 of the electronic device 400.

The cover assembly 422 includes a member 432 and the cover assembly 424 includes a member 434. The member 434 may be a glass member and in some cases the member 432 may also be a glass member. The cover assembly 424 defines a protruding feature 426 that protrudes with respect to a base portion 429. Typically, the member 434 also includes a protruding feature as shown in more detail in the cross-section views of FIGS. 6 to 9, 12C, 13C, 14C, and 15C (e.g., the protruding feature 636 of FIG. 6). As previously described with respect to the cover assembly 224, the protruding feature of the member 434 may be part of a thicker portion of the member as compared to an adjacent portion of the member.

In some cases, the member 434 is a glass member and the thicker portion of the glass member is formed from a greater number of glass layers than the adjacent portion of the glass member, as described in further detail with respect to FIGS. 6 to 9 and 11 to 15C. The member 434 may comprise a first glass component and a second glass component as described with respect to FIGS. 1B, 2 and 6 to 8, or three glass components as described with respect to FIG. 9. In addition, the member 434 may be a composite member and may comprise one or more glass components in combination with one or more glass ceramic or ceramic components, as described with respect to FIGS. 1B, 2, 6 to 9 and 11. The description provided with respect to FIGS. 1B, 2, 6 to 9, and 11 is generally applicable herein and, for brevity, is not repeated here.

The cover assembly 424 may define holes 437 and 438 extending partially through the protruding feature 426. The holes 437 and 438 do not define openings at the external surface of the protruding feature 426. Therefore, the surface region 447 of the protruding feature may at least partially define windows (467, 469) for the optical module 477 and 478. A glass, glass ceramic or ceramic material defining the window 469 may be transparent to visible light, infrared radiation, ultraviolet radiation, or combinations thereof.

In a similar fashion as described for FIG. 2, the cover assembly 424 defines an exterior surface 444. A region 447 of the exterior surface 444 is defined by the protruding feature 426 and a region 449 of the exterior surface 444 is defined by the portion 429. As shown in FIG. 4, a region 448 of the exterior surface 444 extends between the region 447 and the region 449 and may define a side surface of the protruding feature 426.

The electronic device 400 further includes a display 474 and a touch sensor 472 provided below the front cover assembly 422. The display 474 and the touch sensor 472 may be as previously described for FIG. 2 and, for brevity, that description is not repeated here.

The electronic device 400 further includes a camera assembly 475. The partial cross-section view of FIG. 4 shows optical modules 477 and 478 of the camera assembly 475. The camera assembly 475 further includes a support structure 476 that is coupled to an interior of the cover assembly 424. The support structure 476 may have similar features and functions as support structure 276 and the circuit assembly 479 may have similar features and functions as the circuit assembly 279. The description provided with respect to the support structure 276 is generally applicable herein and, for brevity, is not repeated here.

The optical module 477 is aligned with the hole 437 and the optical module 478 is aligned with the hole 438. As shown in FIG. 4, the optical modules 477 and 478 extend substantially through the holes 437 and 438. However, since the holes 437 and 438 are blind holes, the optical modules 477 and 478 do not extend to the exterior surface 444 of the cover assembly.

The cover assembly 424 further includes a cosmetic or decorative coating 460 disposed along an interior surface 433 of the member 434. As shown in FIG. 4, the cosmetic coating 460 is disposed along an interior surface 433 of the member 434 and extends between the support structure 476 and the member 434. The support structure 476 may be coupled to the interior surface 442 through the cosmetic coating in a similar manner as previously described for support structure 276. The cosmetic coating 460 may be as previously described for FIG. 2 and, for brevity, that description is not repeated here.

In a similar fashion as previously described with respect to FIGS. 1B and 2, the different regions of the exterior surface 444 may have similar textures to each other or may have different textures from each other. In the example of FIG. 4, the region 447 has a smoother texture than the regions 448 and 449. Further, the discussion of surface textures provided with respect to 1B and 2 is applicable herein but, for brevity, is not repeated here. Indeed, any of the texture configurations shown in any of the figures may be used with any of the embodiments described herein. For example, the texture configurations shown in FIG. 2 or in FIG. 3 may be implemented in the electronic device 400 (e.g., instead of the texture configuration shown in FIG. 4).

FIG. 5 shows a partial cross-section view of an electronic device including a rear cover assembly and a sensor assembly. The rear cover assembly 524 of the electronic device 500 includes a member 534, which may be a glass member. The cover assembly 524 defines a protruding feature 526 that protrudes with respect to a base portion 529 and defines a raised (or top) surface 527. Typically, the glass member 534 also includes a protruding feature as shown in more detail in the cross-section views of FIGS. 6 to 9, 12C, 13C, 14C, and 15C (e.g., the protruding feature 636 of FIG. 6). The cover assembly 524 further includes a cosmetic or decorative coating 560, although in other examples a cover assembly need not include a cosmetic or decorative coating.

The electronic device 500 also includes a sensor assembly 577. The sensor assembly 577 includes at least one sensor or sensor module. A variety of sensors may be positioned within and/or adjacent to a protruding feature. For example, a health monitoring sensor may be positioned at least partially within or adjacent to a protruding feature of a wearable device, such as a watch. As another example, a protruding feature may define a key region, a button region, or a trackpad region of a laptop computer, desktop computer, phone, tablet, or any other suitable electronic device. A biometric sensor (e.g., a face or fingerprint recognition sensor or a health monitoring sensor), a touch sensor, a force sensor, a proximity sensor or the like may be positioned within or adjacent to the protruding feature (e.g., within the device and proximate to the protruding feature). In some cases, the sensor assembly may further include other components such as support structure and/or a circuit assembly. In the example of FIG. 5, an interior surface of the rear cover assembly 524 is substantially planar adjacent to the sensor assembly. However, this example is not limiting and in additional examples this interior surface may define a recess configured to accommodate at least a portion of the sensor assembly. When the interior surface defines a recess, the thickness of the portion of the member which includes the protruding feature may or may not be thicker than a surrounding portion of the member.

The example of FIG. 5 shows a member 534 which extends across a rear surface of the device 500, but in additional examples, a member having a protruding feature may extend across a front, a rear, and/or a side surface of the electronic device and in some cases may extend over less than an entirety of one or more of these surfaces. In some cases, the member defining a protruding feature may define a user-facing surface of the electronic device.

In some examples, the electronic device 500 may be a wearable electronic device and the protruding feature of the member may define a user-facing surface of the electronic device. The sensor assembly 577 for such an electronic device may include one or more health monitoring sensors such as an electrocardiogram (ecg) sensor, a heart rate sensor, a photoplethysmogram (ppg) sensor, or a pulse oximeter. Further, the sensor assembly may include a sensor to determine whether or not the device is being worn and/or one or more additional sensors (e.g., one or more of the sensors described with respect to FIG. 18). For example, when the wearable electronic device is a watch, the rear cover assembly 524 may define a first portion of the rear surface of the electronic device and may be inset into an opening of a housing structure which defines a second portion of the rear surface of the electronic device. The housing structure may further define a side surface of the electronic device. The watch may further include a front cover assembly which defines a front surface of the electronic device. The front cover assembly may be positioned over a display and a touch sensor.

FIG. 6 shows a partial cross-section view of an example member 634 of an electronic device. In some cases, the member (alternately, cover member) 634 is a glass member having two glass components, each formed from a layer of glass. The member 634 is shown in FIG. 6 with the exterior surface 644 of the member 634 facing upwards. This orientation is rotated with respect to the view of FIGS. 2 to 5. The member 634 may be an example of the member 134 of FIG. 1B or any other member or cover member described herein.

As shown in FIG. 6, the member 634 includes a first component 699 and a second component 696. A first component, such as the first component 699, may also be referred to herein as a first portion or as a first constituent. A second component, such as the second component 696, may also be referred to herein as a second portion or as a second constituent. The first component 699 underlies the second component 696, and the second component 696 typically has at least one lateral dimension that is smaller than that of the first component 699.

Figure 11:
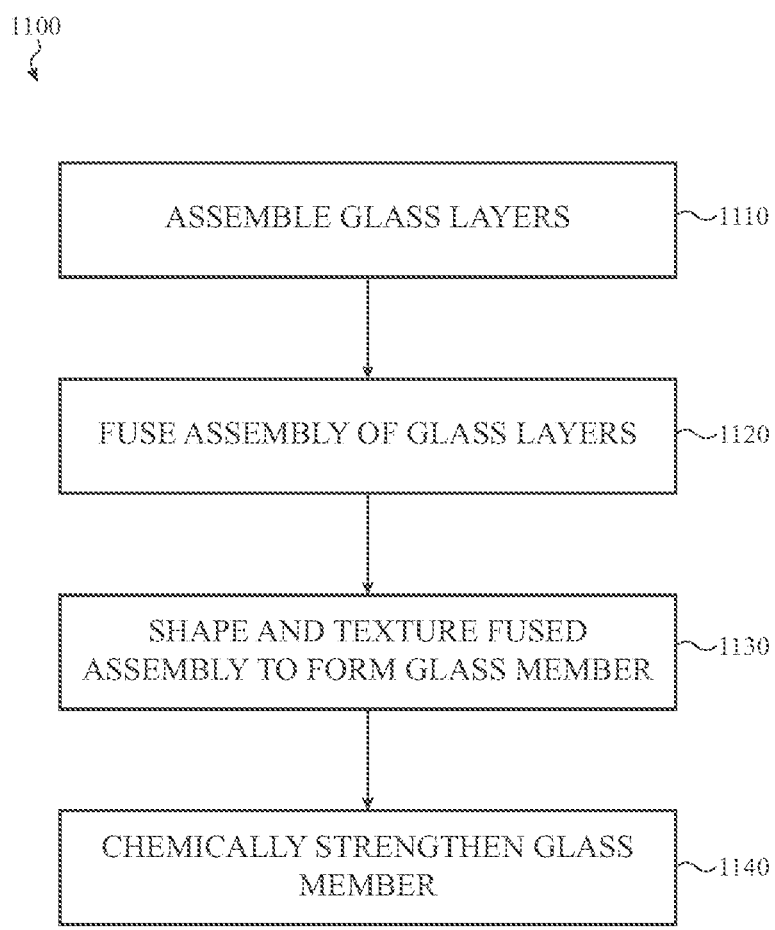
FIG. 11 shows a flow chart of an example process for forming a glass member.

The member 634 may be a glass member, the first component 699 may be a first glass component, and the second component 696 may be a second glass component. In additional cases, the member 634 is a composite member. As one example, the first component 699 is a first glass component and the second component 696 is a glass ceramic or ceramic component (or vice versa). The description of glass ceramic and ceramic components provided with respect to FIG. 11 is generally applicable herein and, for brevity, is not repeated here.

The first component 699 includes or defines the portion 639 of the member 634, also referred to herein as a base portion 639. The base portion 639 defines a base region 649 of the exterior surface 644. The first component 699 also includes the portion 635 underlying the protruding feature 636. The protruding feature 636 protrudes from or is at least partially offset with respect to the base portion 639. A protruding feature of a member, such as the protruding feature 636, may also be referred to generally herein as a feature.

Figure 7:
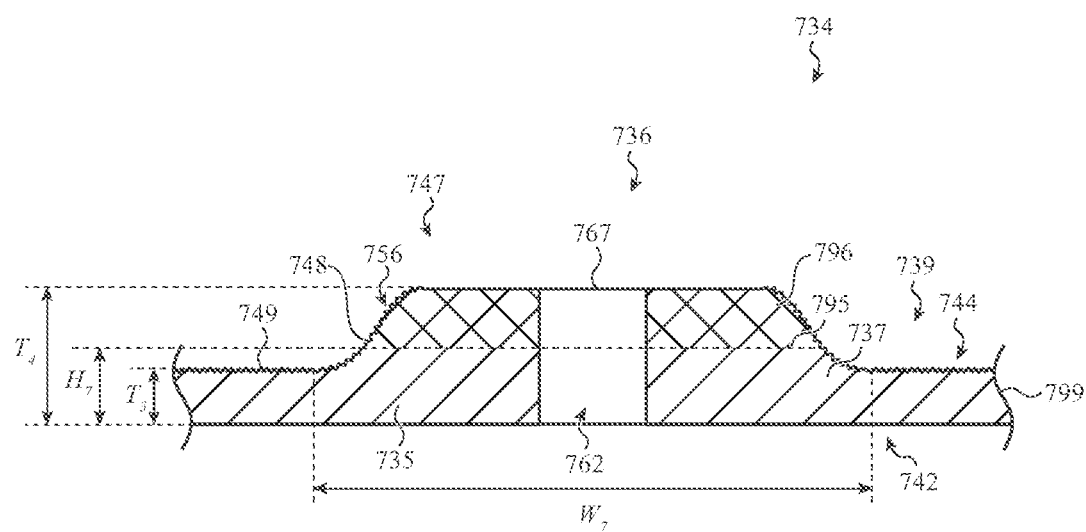
FIG. 7 shows a partial cross-section view of another example of a member.
Figure 8:
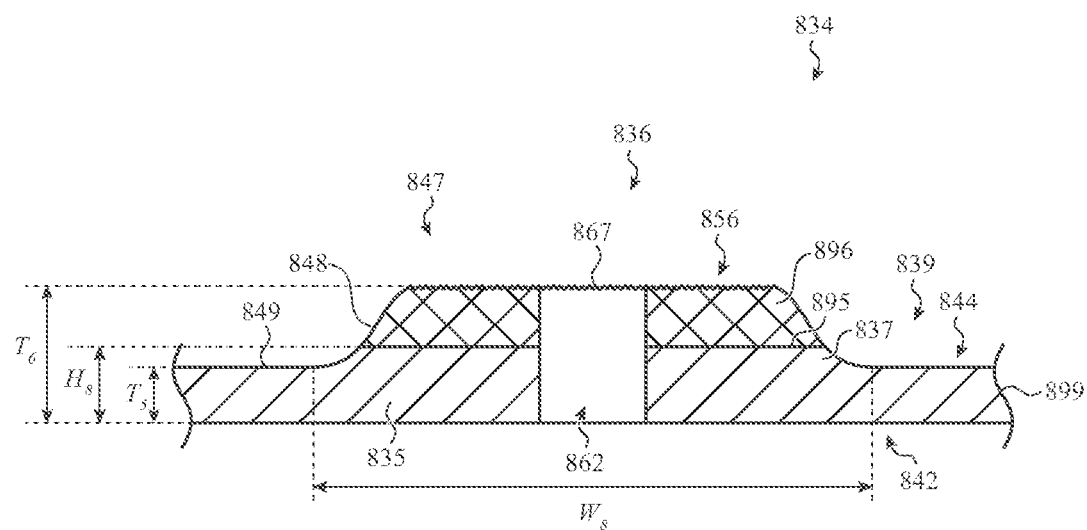
FIG. 8 shows a partial cross-section view of an additional example of a member.
Figure 9:
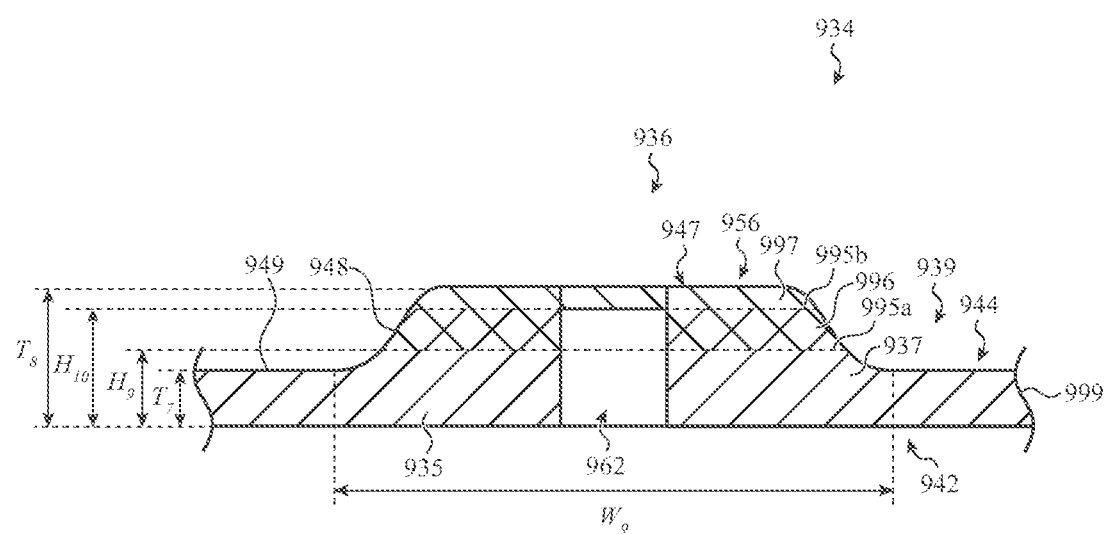
FIG. 9 shows a partial cross-section view of a further example of a member.

The second component 696 of the member may at least partially define the protruding feature 636 of the member 634. In the example of FIG. 6, the second component 696 wholly defines the protruding feature 636. However, in other examples the second component 696 may partially define the protruding feature, as shown in FIGS. 7 to 9. The protruding feature 636 defines a raised region 647 of the exterior surface 644. The raised region 647 also defines a top surface of the protruding feature in FIG. 6. The raised region 647 may define a plateau (a substantially planar surface region). In the example of FIG. 6, the raised region 647 of the exterior surface is offset by a distance $H_1$ from the base region 649 of the exterior surface 644. The protruding feature 636 also defines a width $W_6$ and a side region 648 that extends between the raised region 647 and the base region 649 of the exterior surface 644.

The dashed line 695 schematically indicates the boundary region between the first component 699 and the second component 696. The first component 699 may be bonded to the second component 696 and a boundary region may join the two components. In some cases, the first component 699 may be fused to the second component 696, such as when the first component 699 is a first glass component and the second component 696 is a second glass component. In such cases, the first component 699 and the second component 696 may be referred to as being fusion bonded. When the first component 699 is fused to the second component 696 the boundary region may also be referred to herein as a fusion zone. In some embodiments, the fusion between the first component 699 and the second component 696 is substantially complete. For example, the boundary or fusion zone between the first component 699 and the second component 696 may include few, if any, voids, and any voids present may be small relative to the thickness of the first and the second components. In other cases, the first component 699 may be bonded to the second component 696 using an intermediate material, such an inorganic or organic material (e.g., an adhesive). The intermediate material may be thin relative to the first and the second components.

The first component 699 of the member 636 may be formed from a first layer of glass and the second component 696 of the member may be formed from a second layer of glass. The dashed line 695 may correspond to the boundary between the first layer of glass and the second layer of glass. In some cases, a distinct boundary region may be observed between the first component 699 and the second component 696. In other cases, a distinct boundary region between the first component 699 and the second component 696 may not be detected by the unaided eye.

For example, a distinct fusion zone may not be detected by the unaided eye when the first layer of glass has a composition that is substantially similar to that of the second layer of glass and fusion between the first glass component and the second glass component is substantially complete. In some cases, one or more fusion artifacts may be detected in the fusion zone such as an area of incomplete fusion, a void, a graphite or other impurity particle arising from the thermoforming process, and the like. The size of any fusion artifacts may be sufficiently small that the glass member has the desired strength. For example, a fusion artifact may be less than 50 microns, less than 25 microns, less than 10 microns, or less than 5 microns in size. In some cases, the boundary region and/or a fusion artifact may be observed by sectioning the member 634 and/or using non-destructive techniques. Suitable techniques for observing the boundary region and/or a fusion artifact include, but are not limited to, microscopy, elemental analysis, optical interference detection, ultrasonic detection, and the like.

As shown in FIG. 6, the member 634 further defines a through-hole, such as the through-hole 662. The through-hole 662 extends through the protruding feature 636 and the underlying portion 635 of the member 634. The first component of the member 634 may define a lower or first portion of the through-hole 662 and the second component of the member may define an upper or second portion of the through-hole 662.

The through-hole 662 may allow input to, output from, or placement of a device component such as an optical module as previously described with respect to FIGS. 1B and 2 to 4. The protruding feature 636 may further define an opening 667 to the through-hole, with the opening 667 being located in the raised region 647. In some cases, the member 634 may define an arrangement, array, or set of through-holes and openings extending through the protruding portion 636. For example, the member 634 may define any number of through-holes and openings, such as one, two, three, four, or five through-holes and openings. In additional embodiments, the member need not define a through-hole, but may define a window for an underlying optical module as shown in the example of FIG. 9.

As shown in FIG. 6, the raised region 647 of the exterior surface 644 includes a textured region 656. The textured region 656 may extend across a substantial entirety of the raised region 647 except for the opening(s) such as 667. For example, the textured region 656 may extend substantially across the plateau defined by the raised region 647. In some cases, the textured region 656 may be confined to the plateau while in additional cases the textured region 656 may extend across the side region 648 of the exterior surface. If the member 634 is to be uniformly textured, the textured region 656 may extend across the base region 649 as well.

In some cases, the base region 649 and the raised region 647 may both define respective textured regions of the exterior surface 644 (also referred to herein as textured surface regions). For example, the raised region 647 may define a first texture and the base region 649 may define a second texture different than the first texture. In some cases, the side region 648 (which may also be referred to as a peripheral region) may define a third texture. As examples, the third texture may be the same as the first texture or the second texture or may be formed by an overlap of the first texture and the second texture. As used herein, a texture may include a relatively smooth texture, such as a texture produced by a polishing process.

As schematically illustrated in FIG. 6, the texture of the textured region 656 (of the raised region 647) may be rougher than the texture of the base region 649. For example, the textured region 656 may have at least one roughness parameter, such as a root mean square surface height, a root mean square slope, and/or a mean peak curvature, which is greater than that of the base region 649. In some cases, the base region 649 may not include a textured region or may have a smooth texture that is tactilely and/or visually distinct from that of the textured region 656. For example, the base region 649 may have a relatively smooth texture resulting from a polishing or a glass forming process, such as a texture corresponding to that of a polished surface. In some cases, the textured region 656 of the raised region 647 may be configured to produce a gloss level that is lower than that of a window or lens of an optical module in the opening 667 (e.g., the window 287 of FIG. 2). The textured region 656 may also be configured to produce a translucent and/or hazy appearance.

In other cases, the texture of the textured region 656 may be smoother than the texture of the base region 649. FIGS. 4 and 7 show examples of this arrangement. For example, the textured region 656 may have a texture similar to that of a polished surface and the base region 649 may have a rougher texture.

In the example of FIG. 6, the raised region 647 of the exterior surface is offset by a distance $H_1$ from the base region 649 of the exterior surface. The thickness $T_2$ (the distance between the interior surface 642 and the raised region 647) is greater than the thickness $T_1$ (the distance between the interior surface 642 and the base region 649 of the exterior surface). As examples, the ratio $T_2/T_1$ may be from about 1.25 to about 3 or from about 1.5 to about 2. In some cases, the protruding feature 636 has a thickness greater than about 1 mm and less than or equal to about 2.5 mm and the base portion 639 has a thickness greater than about 0.5 mm and less than about 1 mm.

FIG. 7 shows a partial cross-section view of another example member 734 of an electronic device. The member (alternately, cover member) 734 may comprise two components 799 and 796. A boundary region 795 between the two components may be elevated with respect to a base region 749 of the external surface 744 after a shaping operation. In some cases, the member 734 is a glass member comprising two glass components, each formed from a layer of glass. The member 734 is shown in FIG. 7 with the exterior surface 744 of the member 734 facing upwards. The member 734 may be an example of the member 134 of FIG. 1B. The member 734 defines an exterior surface 744, an interior surface 742, a protruding feature 736, and a base portion 739. The protruding feature defines a width $W_7$.

As shown in FIG. 7, the member 734 includes a first component 799 and a second component 796. The first component 799 includes the base portion 739, the portion 735 underlying the protruding feature 736, and a portion (alternately, part) 737 that defines a lower or first part of the protruding feature 736. The second component 796 defines an upper or second part of the protruding feature and a raised region 747 of the exterior surface. The region 737 of the first component 799 may define a lower or first part (alternately, portion) of the side surface 748 and the second component 796 may define an upper or second part (alternately, portion) of the side surface 748. In a similar fashion as described for FIG. 6, the raised region 747 may define a plateau and may be offset outwardly from the base region 749 of the exterior surface.

In the example of FIG. 7, the dashed line 795 schematically indicates the boundary between the first component 799 and the second component 796. In the example of FIG. 7 the boundary is offset from the height of the base region 749 of the exterior surface 744 and is offset from the interior surface 742 by a distance $H_7$ that is greater than the thickness $T_3$. In some cases, the first component 799 is fusion bonded to the second component 796, such as when the first and the second components are glass components. As previously described with respect to FIG. 6, fusion between the first component 799 and the second component 796 may be substantially complete or some small regions of incomplete fusion may be present along the boundary. In other examples, the first component 799 may be coupled to the second component 796 using an intermediate material, such an inorganic or organic material (e.g., an adhesive) as previously described with respect to FIG. 6.

In some cases, the first component 799 may be a first glass component formed from a first layer of glass and the second component 796 may be a second glass component formed from a second layer of glass. The dashed line 795 may correspond to the boundary between the first layer of glass and the second layer of glass. In additional cases, the member 734 is a composite member. As one example, the first component 799 is a first glass component and the second component 796 is a glass ceramic or ceramic component (or vice versa). The description of glass ceramic and ceramic components provided with respect to FIG. 11 is generally applicable herein and, for brevity, is not repeated here.

In some cases, shaping (e.g., machining) of the layers after the first layer is coupled to the second layer causes the boundary between the layers to be offset from the height of the base region 749 of the exterior surface 744 as described in more detail with respect to FIGS. 11 and 12A to 12C. The description provided with respect to FIGS. 11 and 12A to 12C is generally applicable herein and, for brevity, is not repeated here. In some examples, a distinct boundary region between the first component 799 and the second component 796 may not be readily detected by the unaided eye, while in other examples at least a portion of a boundary region or a fusion artifact may be detected by the unaided eye or using other techniques as previously discussed with respect to FIG. 6. The description provided with respect to FIG. 6 is generally applicable herein and, for brevity, is not repeated here.

As shown in FIG. 7, the member 734 further defines a through-hole, such as the through-hole 762. The through-hole 762 extends through the protruding feature 736 and the underlying portion 735 of the member 734. The first component 799 of the member 734 may define a lower or first portion of the through-hole 762 and the second component 796 of the member may define an upper or second portion of the through-hole 762. The second component 796 may further define an opening 767 to the through-hole, with the opening 767 being located in the raised region 747. The arrangement and function of the through-hole may be as previously described with respect to FIG. 6 and for brevity that description is not repeated here.

As shown in FIG. 7, a textured region 756 extends across the base region 749 and the side surface 748 of the exterior surface 744. In the example of FIG. 7, the texture of the textured region 756 may be rougher than the texture of the raised region 747. For example, the raised region 747 may have a polished texture. However, it should be understood that this example is not limiting and the texture of the textured region 756 may be any of the textures described herein, including those described with respect to FIG. 6. The thickness $T_4$ (the distance between the interior surface 742 and the raised region 747) is greater than the thickness $T_3$ (the distance between the interior surface 742 and the base region 749 of the exterior surface). The values and ratios of these thicknesses ($T_3$ and $T_4$) may be as previously described for the thicknesses $T_1$ and $T_2$ of FIG. 6 and, for brevity, are not repeated here.

FIG. 8 shows a partial cross-section view of an additional example of a member 834 of an electronic device. In the example of FIG. 8, the member (alternately, cover member) 834 retains a layered structure and a distinct boundary can be detected between the layers. In some cases, the member 834 is formed from two layers of glass and a distinct boundary 895 can be detected between the two glass components formed from the two glass layers. The member 834 is shown in FIG. 8 with the exterior surface 844 of the member 834 facing upwards. The member 834 may be an example of the member 134 of FIG. 1B. The member 834 defines an exterior surface 844, an interior surface 842, a protruding feature 836, and a base portion 839. The protruding feature defines a width $W_8$.

The member 834 includes a first component 899 and a second component 896. In some cases, the first component 899 may be a first glass component formed from a first layer of glass and the second component 896 of the member may be a second glass component formed from a second layer of glass. In additional cases, the member 834 is a composite member. As one example, the first component 899 is a first glass component and the second component 896 is a glass ceramic or ceramic component (or vice versa). The description of glass ceramic and ceramic components provided with respect to FIG. 11 is generally applicable herein and, for brevity, is not repeated here.

The first component 899 includes the base portion 839, the portion 835 underlying the protruding feature 836, and a portion (alternately, part) 837 that defines a lower or first part of the protruding feature 836. The second component 896 defines an upper or second part of the protruding feature 836 and a raised region 847 of the exterior surface. The region 837 of the first component 899 may define a lower or first part of the side surface 848 and the second component 896 may define an upper or second part of the side surface 848. In a similar fashion as described for FIG. 6, the raised region 847 may define a plateau and may be offset outwardly from the base region 849 of the exterior surface.

In the example of FIG. 8 the first component 899 is bonded to the second component 896. The line 895 schematically indicates the boundary between the first component 899 and the second component 896. In the example of FIG. 8, the boundary indicated by the line 895 is distinct and extends across the protruding feature 836. In some cases, the line 895 indicates a fusion zone. This boundary is offset from the height of the base region 849 of the exterior surface 844 and is offset from the interior surface 842 by a distance $H_8$ that is greater than the thickness $T_5$. In other examples, the first component 899 may be coupled to the second component 896 using an intermediate material, such an inorganic or organic material (e.g., an adhesive) as previously described with respect to FIG. 6.

In some cases, the first component 899 of the member 834 may be formed from a first layer of glass and the second component 896 of the member may be formed from a second layer of glass. The solid line 895 may correspond to the boundary region between the first layer of glass and the second layer of glass, which may be detected by the unaided eye across the protruding feature. As previously described with respect to FIG. 7, machining of the member 836 after the first layer of glass is coupled to the second layer of glass causes the boundary region between the layers to be offset from the height of the base region 849. The description provided with respect to FIGS. 11 and 12A to 12C is generally applicable herein and, for brevity, is not repeated here.

As shown in FIG. 8, the member 834 further defines a through-hole, such as the through-hole 862. The through-hole 862 extends through the protruding feature 836 and the underlying portion 835 of the member 834. The first component 899 of the member 834 may define a lower or first portion of the through-hole 862 and the second component 896 of the member may define an upper or second portion of the through-hole 862.

The through-hole 862 may allow input to, output from, or placement of a device component such as an optical module as previously described with respect to FIGS. 1B and 2 to 4. The protruding feature 836 may further define an opening 867 to the through-hole, with the opening 867 being located in the raised region 847. The arrangement and function of the through-hole may be as previously described with respect to FIG. 6 and for brevity that description is not repeated here.

As shown in FIG. 8, the raised region 847 of the exterior surface 844 includes a textured region 856. In the example of FIG. 8, the texture of the textured region 856 may be rougher than the texture of the base region 849. However, it should be understood that this example is not limiting and the texture of the textured region 856 may be any of the textures described herein, including those described with respect to FIG. 6. In addition, the thickness $T_6$ (the distance between the interior surface 842 and the raised region 847) is greater than the thickness $T_5$ (the distance between the interior surface 842 and the base region 849 of the exterior surface). The values and ratios of these thicknesses ($T_5$ and $T_6$) may be as previously described for the thicknesses $T_1$ and $T_2$ of FIG. 6 and, for brevity, are not repeated here.

FIG. 9 shows a partial cross-section view of a further example of a member 934 of an electronic device. The member (alternately, cover member) 934 may be formed from three layers (e.g., three layers of glass) in order to provide a "window" over the hole 962. The member 934 is shown in FIG. 9 with the exterior surface 944 of the member 934 facing upwards. The member 934 may be an example of the member 134 of FIG. 1B. The member 934 defines an exterior surface 944, an interior surface 942, a protruding feature 936, and a base portion 939. The protruding feature defines a width $W_9$.

As shown in FIG. 9, the member 934 includes a first component 999, a second component 996, and a third component 997. In some cases, the member 934 is a glass member, the first component 999 is a first glass component, the second component 996 is a second glass component, and the third component 997 is a third glass component. In additional cases, the member 934 is a composite member. As one example, the first component 999 is a first glass component, the second component 996 is second glass component, and the third component 997 is a glass ceramic or ceramic component. A glass, glass ceramic or ceramic material defining the third component may be transparent to visible light, infrared radiation, ultraviolet radiation, or combinations thereof. The description of glass ceramic and ceramic components provided with respect to FIG. 11 is generally applicable herein and, for brevity, is not repeated here.

The first component 999 includes the base portion 939, the portion 935 underlying the protruding feature 936, and a portion (alternately, part) 937 that defines a lower or first part of the protruding feature 936. The second component 996 defines an intermediate or second part of the protruding feature. The third component 997 defines an upper or third part of the protruding feature and a raised region 947 of the exterior surface. The portion 937 of the first component 999 may define a lower or first part of the side surface 948, the second component 996 may define an intermediate or second part of the side surface 948, and the third component 997 may define an upper or third part of the side surface 948. In a similar fashion as described for FIG. 6, the raised region 947 may define a plateau and may be offset outwardly from the base region 949 of the exterior surface.

The dashed lines 995a and 995b schematically indicate the boundaries between the first component 999, the second component 996, and the third component 997. In the example of FIG. 9 the boundaries 995a and 995b are offset from the height of the base region 949 of the exterior surface 944 and are offset from the interior surface 942 by a distances H9 and H10, respectively (each greater than the thickness T7). In some cases, the first component 999 is fusion bonded to the second component 996 and the second component 996 is fusion bonded to the third component 997, such as when the first, the second, and the third components are glass components. As previously described with respect to FIG. 6, fusion between the first component 999 and the second component 996 and between the second component 996 and the third component 997 may be substantially complete or some small regions of incomplete fusion may be present along the boundary. In other examples, the first, the second, and the third components may be coupled using an intermediate material, such an inorganic or organic material (e.g., an adhesive) as previously described with respect to FIG. 6.

The first component 999 of the member 934 may be formed from a first layer of glass, the second component 996 of the member may be formed from a second layer of glass, and the third component 997 of the member may be formed from a third layer of glass. In some cases, one or more holes are formed in the second layer of glass prior to fusing of the layers of glass in order to facilitate formation of the hole 962. The dashed lines 995a and 995b may correspond to the boundary regions between the layers of glass. In some examples a distinct boundary region between the first component 999 and the second component 996 and/or the second component 996 and the third component 997 may not be detected by the unaided eye while in other examples at least a portion of one or more boundary regions or a fusion artifact may be detected by the unaided eye or using other techniques as previously discussed with respect to FIG. 6. The description provided with respect to FIG. 6 is generally applicable herein and, for brevity, is not repeated here.

As shown in FIG. 9, the member 934 further defines a hole, such as the hole 962. The hole 962 extends through the second component 996 and the underlying portion 935 of the first component 999 but does not extend through the third component 997. The hole 962 may also be referred to as a blind hole. The third component 997 therefore can provide a window over the hole 962. The first component 999 of the member 934 may define a lower or first portion of the hole 962 and the second component 996 of the member may define an upper or second portion of the hole 962. The hole 962 may allow input to, output from, or placement of a device component such as an optical module as previously described with respect to FIGS. 1B and 2 to 4. The third component 997 of the glass member may function as a window for the optical module. The number of holes may be similar to the number of through-holes previously described with respect to FIG. 6 and for brevity that description is not repeated here.

As shown in FIG. 9, the exterior surface 944 includes a textured region 956. In the example of FIG. 9, the texture of the textured region extends across the raised region 947, the side surface 948, and the base region. For example, the textured region 956 may have a polished texture. In additional examples, the texture of the textured region 956 may be smoother than the texture of the base region 949 to facilitate its use as a window for an optical component. The thickness $T_8$ (the distance between the interior surface 942 and the raised region 947) is greater than the thickness $T_7$ (the distance between the interior surface 942 and the base region 949 of the exterior surface). The values and ratios of these thicknesses ($T_7$ and $T_8$) may be as previously described for the thicknesses $T_1$ and $T_2$ of FIG. 6 and, for brevity, are not repeated here.

FIG. 10 shows a detail view of a textured region 1056 of a member 1034. The textured region 1056 may be an example of the textured region 656 of FIG. 6 in detail area 1-1 or of any other textured region shown herein. In some cases, the textured region 1056 may be defined by a raised region of the exterior surface 1047 of the member 1034, as previously described with respect to FIG. 6. A textured region may also be referred to herein as a textured surface region.

The textured region 1056 comprises a plurality of surface features 1080. The example of the surface features 1080 provided in FIG. 10 is not limiting and in general the surface features 1080 of a surface region of the member 1034 may define any of a range of shapes or configurations. The surface features 1080 may have a variety of shapes, such as rounded or angular features. As examples, the surface features 1080 may define a circular, oval, polygonal, rectangular, or irregular surface contour. Furthermore, the surface features 1080 may define protrusions, recesses, or a combination thereof and may have any suitable shape and may be pyramidal, conical, cylindrical, arched, have a curved upper surface or a frustum of a shape such as a cone, and so on.

As shown in FIG. 10, the surface features 1080 may define one or more recesses, such as the surface feature 1084. A recess may define a minimum point, such as the point 1085. The surface features 1080 may also define one or more protrusions, such as the surface feature 1086. A protrusion may define a maximum point, such as the point 1087. As schematically shown in FIG. 10, the surface features 1080 may define a set of minimum points as well as a set of maximum points. The set of maximum points may also be referred to as a set of peaks. The surface features 1080 may define a set of recesses, each recess being positioned between adjacent peaks of the set of peaks. The shapes of the peaks and the valleys are not limited to those schematically shown in FIG. 10. For example, at least some of the peaks may have a somewhat larger radius of curvature (and smaller curvature) to provide the desired tactile properties in addition to the desired level of cleanability for the textured surface.

In some embodiments, the surface features 1080 define a set of hills and valleys. The hills and valleys may be defined using areal texture analysis techniques as described below. The surface feature 1086 may generally correspond to a hill feature and the surface feature 1084 may generally correspond to a valley feature. In some embodiments, a set of hills and valleys has a substantially uniform spacing between hill features, valley features, or a combination thereof. In additional embodiments, a set of valleys may have a non-uniform or an irregular spacing between hill features and/or valley features.

The heights of the surface features 1080 may be measured with respect to a reference surface 1082. For example, the heights of the hills may be determined from the maximum points (e.g., point 1087) and the heights of the valleys may be determined from the minimum points (e.g., point 1085). The member 1034 may be an example of the member 134 or any other members described herein. Details of these members are applicable to the member 1034 and, for brevity, will not be repeated here.

The surface features 1080 may be configured to provide particular optical properties to one or more surface regions of the member 1034, as well as to a cover assembly and electronic device including the member 1034. However, the surface features 1080 defining the texture of the surface region may not be individually visually perceptible. In some cases, the texture of the surface region may cause the member 1034 to appear translucent, rather than transparent. In some cases, the texture may be configured to provide particular levels of such optical properties such as transmissive haze, clarity, gloss, graininess, and combinations thereof.

A textured surface region of the member, such as the textured region 1056, may be configured to provide a specified gloss level to the surface. In some embodiments, the textured region 1056 may have a gloss value of less than about 50 gloss units, less than about 40 gloss units, from 2 gloss units to 20 gloss units, from 2 gloss units to 10 gloss units, from 5 gloss units to 50 gloss units, from 5 gloss units to 20 gloss units, from 10 gloss units to 50 gloss units, from 10 gloss units to 45 gloss units, or from 15 gloss units to 45 gloss units as measured at 60 degrees. The gloss level may be measured in the absence of a cosmetic coating. In additional embodiments the textured region 1056 may have a higher gloss. For example, a textured region 1056 having a relatively high gloss may have a gloss value greater than about 70 gloss units and less than or equal to about 150 gloss units. In some cases, the difference between the gloss of the textured region and another region of the exterior surface may be at least 10% and may be more than 100%. In some cases, the gloss of the textured region may be measured using commercially available equipment and according to ASTM or ISO standard test methods. The angle measurement may refer to the angle between the incident light and the perpendicular to the textured region of the surface.

A textured surface region of the member 1034, such as the textured region 1056, may be configured to provide a specified level of transmissive haze to the corresponding portion of the member. In some cases, the transmissive haze of the textured region may be measured using commercially available equipment and according to ASTM or ISO standard test methods. The transmissive haze may relate to the amount of light subject to wide angle scattering (e.g., greater than 2.5 degrees). In some cases, the transmissive haze may be greater than or equal to about 50%, greater than or equal to about 60%, or greater than or equal to about 70%. For example, the transmissive haze may be from about 60% to about 90% or from about 70% to about 80%. As non-limiting examples, the transmissive haze may be measured using a haze-gard i device available from BYK or a GC 5000L variable photometer available from Nippon Denshoku. The transmissive haze scattering may be measured for the cover assembly or member as removed from the electronic device. The transmissive haze of another region of the exterior surface of the member, such as the base region, may be similar to or different from that of textured region 1056.

A textured surface region of the member 1034, such as the textured region 1056, may be configured to provide a specified level of clarity to the corresponding portion of the member. The clarity or the transmissive narrow angle scattering of the textured region may be measured using commercially available equipment and according to ASTM or ISO standard test methods. In some cases, the clarity may be less than about 50%, less than about 40%, less than about 30%, less than about 20%, less than about 15%, or less than about 10%. For example, the clarity may be from about 5% to about 30%, from about 5% to about 20%, from about 5% to about 15%, or from about 5% to about 15%. The transmissive narrow angle scattering may be measured using a haze-gard i device available from BYK or a GC 5000L variable photometer available from Nippon Denshoku. A clarity value may be determined from measurements of the intensity in a central region a ($I_{central}$) and an intensity in a ring around the central region ($I_{ring}$). For example, the clarity value may be equal to $100\%*(I_{central}-I_{ring})/(I_{central}+I_{ring})$. The clarity or the transmissive narrow angle scattering may be measured for the cover assembly or member as removed from the electronic device.

In some cases, a textured region of the member may be configured to provide a specified level of visual uniformity to the corresponding portion of the member. The level of visual uniformity of another region of the exterior surface of the member, such as the base region, may be similar to or different from that of textured region 1056. The graininess of a textured region may be measured under diffused illumination using commercially available equipment. The graininess may be measured similarly for a textured region of a cover assembly. In some cases, an image of the textured surface of the member 1034 may be obtained using a digital camera and the lightness of each pixel of the image may be determined, thereby allowing determination of the lightness variation across the textured surface. For example, the BYK-mac device available from BYK may produce a graininess value determined from a histogram of the lightness levels. The graininess of the textured surface may be less than about 1.5 or less than about 1.0. In addition, the graininess may be from about 0.1 to about 1.5, from about 0.1 to about 1.0, from about 0.25 to about 1.5, from about 0.25 to about 1.0, from about 0.5 to about 1.5, or from about 0.5 to about 1.0. These graininess values may be measured prior to application of any cosmetic coating to the member.

A textured surface region of the member 1034, such as the textured region 1056, may be configured to provide a specified level of cleanability. For example, the texture of the textured region 1056 may be configured so that a root mean square (RMS) height of the features is not overly large. The texture may also be configured so that a size of any recessed surface features is sufficiently large to facilitate cleaning. In addition, the texture may be configured so that the root mean square (RMS) slope and/or the mean peak curvature of the surface features is small enough to provide the desired tactile properties in addition to the desired level of cleanability.

Surface texture parameters include areal surface texture parameters such as amplitude parameters, spatial parameters, and hybrid parameters. Surface filtering may be used to exclude surface noise and/or surface waviness before determining the surface texture parameters. In addition, a segmentation technique may be used to determine feature parameters such as the maximum diameter, the minimum diameter, the area, and the perimeter. These parameters may be calculated on the basis of the feature shape as projected onto the reference surface (e.g., a reference plane). Mean values may be determined for a given class of surface features (e.g., hills or valleys). Surface texture parameters and methods for determining these parameters (including filtering and segmentation) are described in more detail in International Organization for Standardization (ISO) standard 25178 (Geometric Product Specifications (GPS)—Surface texture: Areal).

These surface texture parameters may be measured using commercially available equipment, including equipment using optical measurement techniques. An example optical measurement technique is interferometry and an example of commercial equipment using this technique is a coherence scanning interferometry profiler (white light), such as a Zygo coherence scanning interferometry optical profiler. Another example optical measurement technique is confocal microscopy and an example of commercial equipment using this technique is a laser scanning confocal microscope, such as a Keyence laser scanning confocal microscope. Images may be tiled to measure a larger area.

For example, the surface features 1080 of one or more surface regions of the member 1034 may be characterized, in part, by the heights of the surface features. The height may be measured with respect to a reference surface, such as the arithmetical mean of the surface (schematically shown by line 1082 in FIG. 10). The heights of the surface features 1080 may not be uniform, so that the surface features have a distribution of heights. The magnitude of the heights of the surface features 1080 may fall in the range from zero to about 5 microns, zero to about 2.5 microns, from zero to about 2 microns, from zero to about 1.5 microns, or from zero to about 1 micron. The surface features 1080 may be characterized by the root mean square height Sq or the arithmetic mean height Sa of the surface. The root mean square (RMS) height of the surface features 1080 may be greater than zero and less than about 5 microns, greater than zero and less than about 2.5 microns, greater than zero and less than about 2 microns, greater than zero and less than about 1.5 microns, greater than zero and less than about 1 micron, from about 0.1 microns to about 2.5 microns, from about 0.1 microns to about 2 microns, from about 0.1 microns to about 1.5 microns, from about 0.1 microns to about 1.25 microns, from about 0.1 microns to about 1.0 micron, from about 0.2 microns to about 2.5 microns, from about 0.2 microns to about 2 microns, from about 0.2 microns to about 1.5 microns, from about 0.2 microns to about 1.25 microns, from about 0.2 microns to about 1.0 micron, from about 0.25 microns to about 2.5 microns, from about 0.25 microns to about 2 microns, from about 0.25 microns to about 1.5 microns, from about 0.25 microns to about 1.25 microns, from about 0.25 microns to about 1.0 micron, from about 0.5 microns to about 2.5 microns, from about 0.5 microns to about 2 microns, from about 0.5 microns to about 1.5 microns, from about 0.5 microns to about 1.25 microns, from about 0.5 microns to about 1.0 micron, from about 0.75 microns to about 5 microns, or from about 1 micron to about 5 microns. In some cases, one textured region may be referred to as being rougher than another textured region when it has a greater RMS height.

The RMS height of another region of the exterior surface of the member 1034, such as the base region, may be similar to or different from that of textured region 1056. For example, the RMS height of the raised region may be greater than that of the base region. For example, the RMS height of the raised region may be at least 10% and less than 150%, at least 10% and less than 100%, or at least 10% and less than 50% greater than that of the base region. In some cases, the RMS height of the base region may be less than 0.5 microns, less than 250 nm, or from 1 nm to about 250 nm. In some cases, the RMS height of the base region may be similar to that of a polished surface, such as from about 1 nm to about 150 nm, from about 1 nm to about 125 nm, from about 1 nm to about 100 nm, from about 1 nm to about 75 nm, from about 1 nm to about 50 nm, from about 1 nm to about 25 nm, or from 1 nm to about 10 nm.

In addition, the surface features 1080 of one or more surface regions may be characterized by lateral parameters, such as the distance between peaks. The spacing between peaks may not be uniform, so that there is a distribution of spacings between peaks. The average (mean) distance or spacing between peaks may be referred to as the average pitch or mean pitch. The average pitch may be from about 1 micron to about 20 microns, from about 1 micron to about 15 microns, from about 1 micron to about 10 microns, from about 2.5 microns to about 20 microns, from about 2.5 microns to about 15 microns, from about 2.5 microns to about 10 microns, from about 5 microns to about 40 microns, from about 5 microns to about 20 microns, from about 5 microns to about 15 microns, or from about 5 microns to about 10 microns.

In some embodiments, the surface features 1080 of one or more surface regions may be configured so to have a particular ratio of the average height of the peaks to the average spacing of the peaks. For example, the ratio of the RMS height to the mean pitch may be from about 0.01 to about 0.6, from about 0.01 to about 0.3, from about 0.02 to about 0.6, from about 0.02 to about 0.3, from about 0.03 to about 0.6, from about 0.03 to about 0.3, from about 0.04 to about 0.6, or from about 0.04 to about 0.3.

The surface features 1080 of one or more surface regions may also be characterized by a lateral size. For example, the surface features 1080 may be characterized by a maximum lateral (or linear) size and a minimum lateral (or linear size). The surface features 1080 may have a maximum lateral size small enough that they are not visually perceptible as individual features. In addition, the lateral size and spacing of the surface features 1080 may be configured so that the member has a sufficiently low level of graininess.

The surface features 1080 of one or more surface regions may be characterized by the root mean square slope (Sdq), also referred to as the root mean square gradient. In some embodiments, the root mean square slope may be greater than zero and less than about 1.25, greater than zero and less than about 1, from 0.1 to less than about 1.25, from about 0.1 to less than about 1, from about 0.25 to less than about 1, from about 0.25 to about 0.75, or from about 0.1 to about 0.5. In some cases, the root mean square slope of the raised region is greater than that of the base region. For example, the root mean square slope of the raised region may be at least 10% and less than 60% greater than that of the base region.

The surface features 1080 of one or more surface regions may also be characterized by the curvature of the peaks (also referred to as summits), such as by the arithmetic mean summit curvature $S_{sc}$, also referred to herein as the mean peak curvature. In some embodiments, the arithmetic mean summit curvature is greater than zero and less than about 2.0 microns$^{-1}$, greater than zero and less than or equal to about 1.5 microns$^{-1}$, from about 0.1 microns$^{-1}$ to about 2.0 microns$^{-1}$, from about 0.1 microns$^{-1}$ to about 1.5 microns$^{-1}$, from about 0.25 microns$^{-1}$ to about 2.0 microns$^{-1}$, from about 0.25 microns$^{-1}$ to about 1.5 microns$^{-1}$, from about 0.5 microns$^{-1}$ to about 2.0 microns$^{-1}$, from about 0.5 microns$^{-1}$ to about 1.5 microns$^{-1}$, from about 0.75 microns$^{-1}$ to about 2.0 microns$^{-1}$, or from about 0.75 microns$^{-1}$ to about 1.5 microns$^{-1}$. In some cases, the mean peak curvature of the raised region is greater than that of the base region. For example, the mean peak curvature of the raised region may be at least 10% and less than 50% greater than that of the base region.

The surface features 1080 of one or more surface regions may also be characterized by an autocorrelation length. In some embodiments, the autocorrelation length is from about 1 micron to about 50 microns, from about 2 microns to about 30 microns, or from about 3 microns to about 25 microns.

FIG. 11 shows a flow chart of an example process 1100 for forming a glass member from at least two glass layers. Typically, the glass member and each of the glass layers includes a silica-based glass material. The glass material may have a network structure, such as a silicate-based network structure. In some embodiments, the glass material includes an aluminosilicate glass. As used herein, an aluminosilicate glass includes the elements aluminum, silicon, and oxygen, but may further include other elements. Typically, the glass material includes an ion-exchangeable glass material, such as an alkali metal aluminosilicate glass (e.g., a lithium aluminosilicate glass). An ion-exchangeable aluminosilicate glass may include monovalent or divalent ions that compensate for charges due to replacement of silicon ions by aluminum ions. Suitable monovalent ions include, but are not limited to, alkali metal ions such as $Li^+$, $Na^+$, or $K^+$. Suitable divalent ions include alkaline earth ions such as $Ca^{2+}$ or $Mg^{2+}$. The description of suitable glass materials provided with respect to FIG. 11 is generally applicable to the members (cover members) and glass layers described herein. In some cases, each of the glass layers has a substantially similar composition. In additional cases, the glass layers may differ in composition.

Figure 12A:
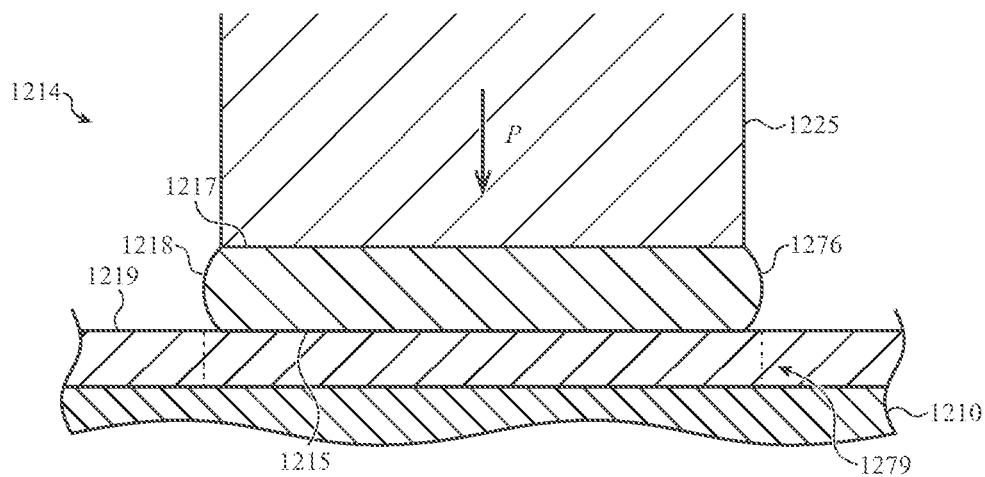
FIGS. 12A, 12B, and 12C schematically show cross-section views of stages of an example process for forming a member.
Figure 12B:
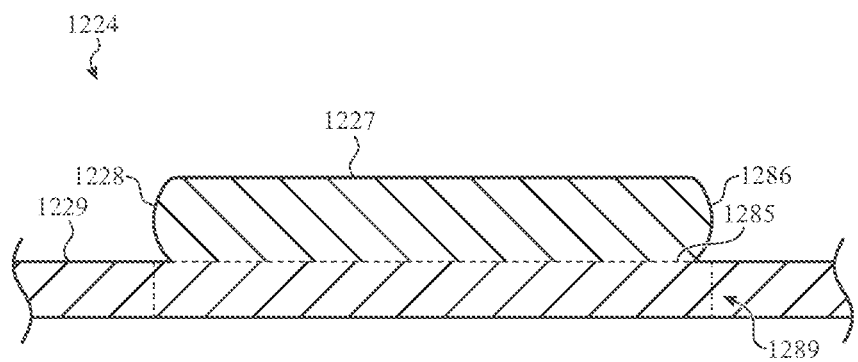
Figure 12C:
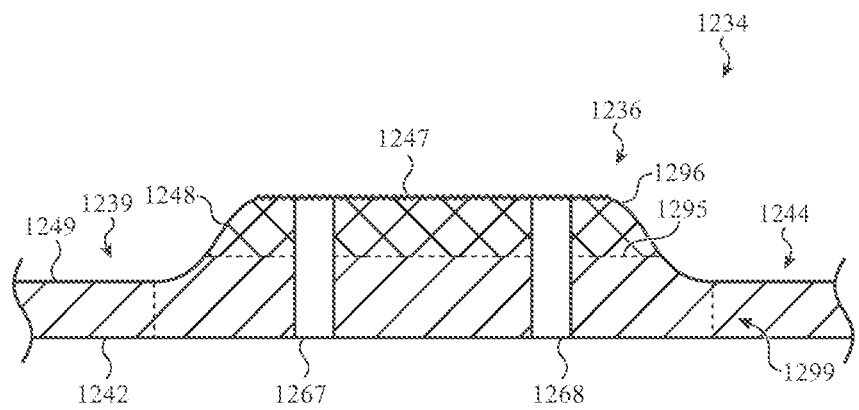
Figure 13A:
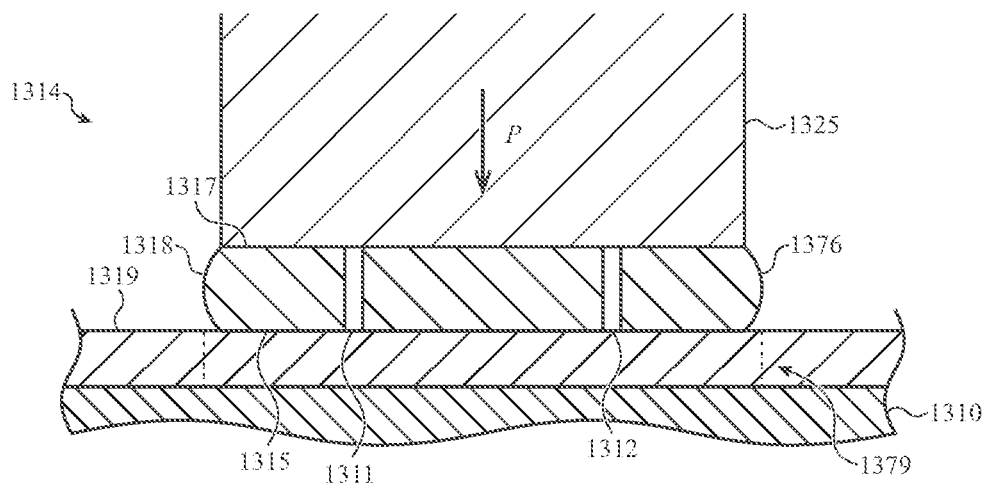
FIGS. 13A, 13B, and 13C schematically show cross-section views of stages of an additional example process for forming a member.
Figure 13B:
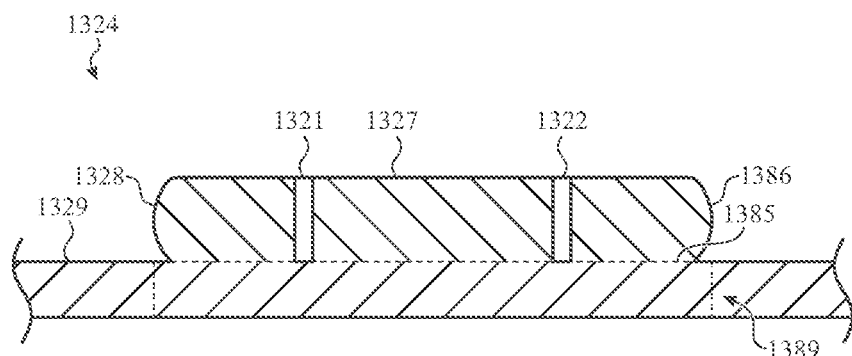
Figure 14A:
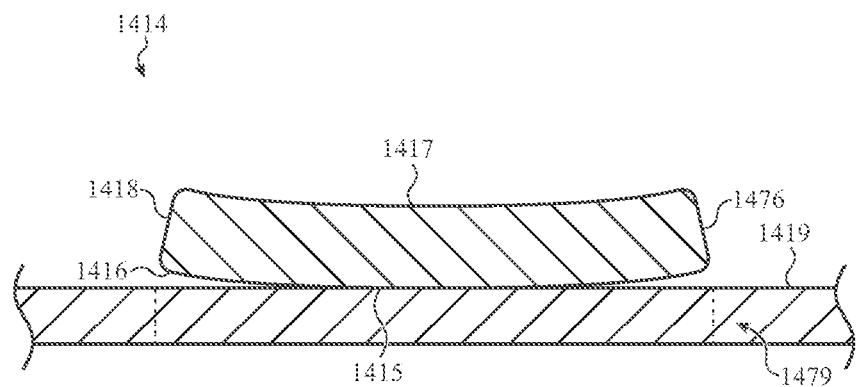
FIGS. 14A, 14B, and 14C schematically show cross-section views of stages of another example process for forming a member.
Figure 15A:
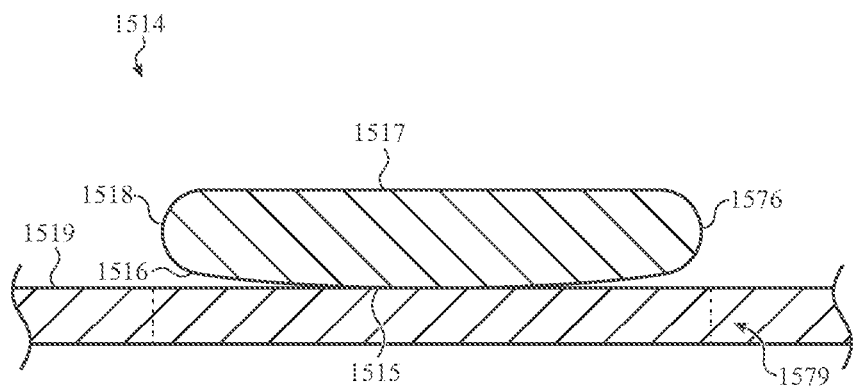
FIGS. 15A, 15B, and 15C schematically show cross-section views of stages of a further example process for forming a member.

The glass layers used to form the glass member may be shaped prior to operation 1110 of assembling the glass layers. The glass layers may be shaped to a desired shape and size by machining. In addition, the surfaces of the glass layers may be finished so that adjacent layers can closely contact each other. In some cases, the surfaces of adjacent glass layers are substantially flat and smooth as schematically illustrated in FIGS. 12A to 12C. In other cases, one of the surfaces of the adjacent glass layers is rounded, rather than flat, as schematically illustrated in FIGS. 14A and 15A. In some cases, pilot holes may be formed (e.g., by machining) in one or more of the glass layers, as schematically illustrated in FIGS. 13A and 13B.

After the shaping operation, a glass layer forming a first or lower portion of the glass member typically has larger lateral dimensions than the glass layer(s) forming the upper portion(s) of the glass member. In some cases, the thickness of the first glass layer forming the first or lower portion of the glass member is from 0.5 mm to 1.0 mm, or from 0.75 mm to 1.5 mm, and the thickness of the glass layer(s) forming the upper portion(s) of the glass is from 0.75 to 1.5 mm or from 1.0 mm to 2 mm. In some cases, the desired shape of the glass layers includes rounded or chamfered corners. Following the shaping operation, the glass layers may be cleaned, such as by washing. The glass layers may also be etched or plasma treated following the shaping operation.

The process 1100 of FIG. 11 includes an operation 1110 of assembling the glass layers used to form the glass member, thereby forming an assembly of glass layers (also referred to herein as an assembly). In some embodiments, the operation 1110 comprises assembling the first glass layer with the second glass layer to form the assembly of glass layers. In some cases, the layers may be assembled by placing them in contact with one another. In additional cases, the layers may be at least partially bonded during the operation 1110, such as by laser bonding, optical bonding, or the like. Examples of assemblies of two glass layers are shown in FIGS. 12A, 13A, 14A, and 15A. The assembly operation may be performed under clean conditions to limit introduction of foreign matter between the glass layers.

As shown in FIG. 11, the process 1100 includes an operation 1120 of fusing (also referred to as fusion bonding) the assembly of glass layers to form a fused assembly.

Typically, the fusing operation comprises heating the assembly and applying pressure to at least the upper layers of the assembly. The assembly of glass layers may be heated and pressure applied in a thermoforming apparatus, which may also be referred to as a forming tool. In some cases, the assembly is placed on a support surface and a tool-piece such as plunger, piston, or the like contacts the upper layer of the assembly, as schematically illustrated in FIGS. 12A and 13A. For example, the support surface may be substantially flat.

The fusing operation may include heating the assembly of glass layers to a temperature between the glass transition temperature and a softening point of each of the glass layers, to a temperature between an annealing point and a softening point of each of the glass layers, or to a temperature between a strain point and a softening point of each of the glass layers. For example, the strain point (viscosity of about $10^{14.5}$ Poise) is the temperature at which internal stress in the glass is relieved in hours. The annealing point (viscosity of about $10^{13.2}$ to $10^{13.4}$ Poise) is the temperature at which internal stress in the glass is relieved in minutes. The dilatometric softening point is defined by a viscosity of about $10^9$ to $10^{11}$ Poise while the Littleton softening point is defined by a viscosity of about $10^{7.6}$ Poise; a "softening point" as referred to herein may refer to either of these temperatures. The working point is defined by a viscosity of about $10^4$ Poise. The glass transition temperature (viscosity of about $10^{12}$ to $10^{13}$ Poise) is the temperature at which glass transitions from super-cooled liquid to a glassy state. The heating may be performed in several stages. In some cases, the assembly may be heated while the tool-piece rests on the upper layer of the assembly and the assembly as a whole rests on the support surface.

Figure 16A:
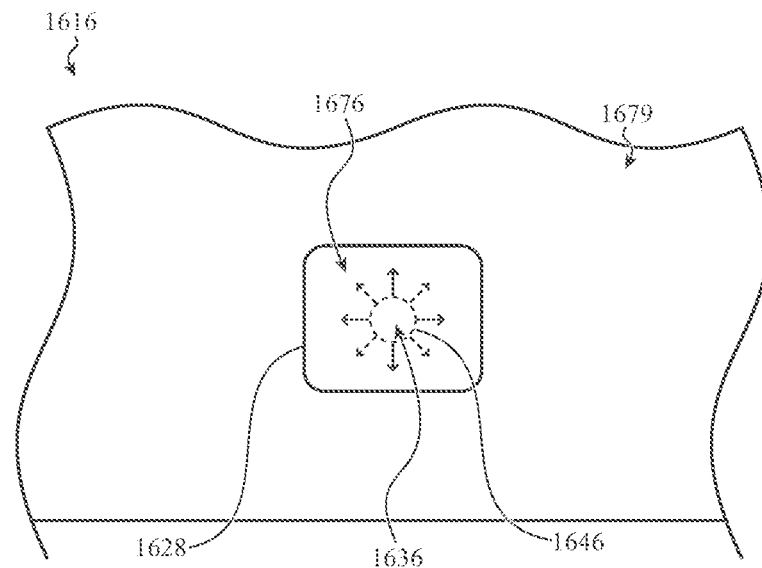
FIGS. 16A and 16B schematically show a top view of stages in a fusion operation in a process for forming a member.
Figure 16B:
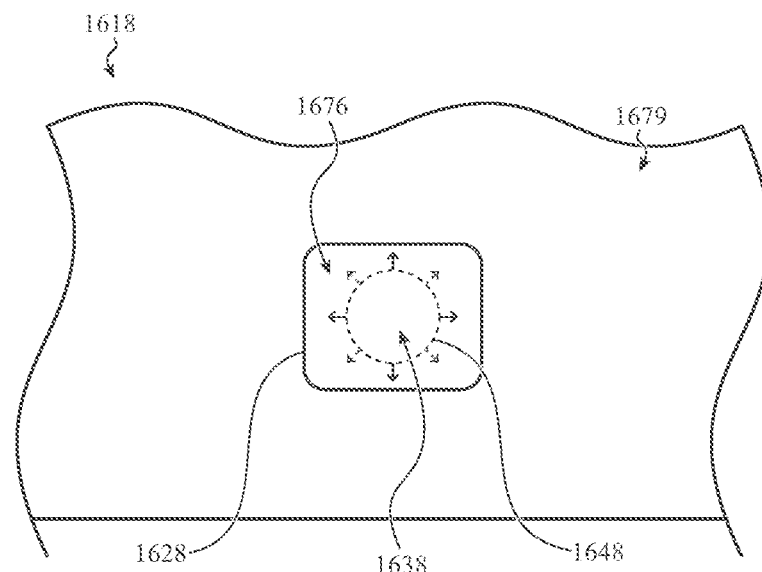

The fusing operation may also include applying pressure to at least the upper layers of the assembly. In some cases, the tool-piece contacts the upper layer of the assembly, but not the remainder of the assembly, while pressure is applied to the assembly through the tool-piece. In some cases, the pressure may be greater than that due to the weight of the tool-pieces. In some cases, fusion between the lower layer and the upper layer(s) of the assembly may begin in a central region of the upper layers(s) and then may move outwards towards the sides of the upper layers. FIGS. 16A and 16B schematically illustrate movement of a fusion front in such a fusion operation. FIGS. 14A and 15A show examples of layer shapes that may lead to such movement of the fusion front during the fusion operation.

The operation of fusing the assembly of glass layers creates an integral fused assembly. The portion of the fused assembly formed from multiple layers of glass typically has a greater thickness than a portion of the fused assembly formed from a single layer of glass. In addition, this thicker portion of the fused assembly protrudes from an adjacent portion of the thinner portion of the fused assembly. The protruding feature of the glass member will be located within this thicker portion, while the base portion will be located within the adjacent thinner portion. Each of the thicker portion and the thinner portion defines an external surface and an internal surface. The operation of fusing the assembly of the glass layers need not achieve complete fusion between the layers. For example, when material is to be removed from the side surfaces of the upper layer(s) of the fused assembly in operation 1130, some of the material of the upper layer(s) to be removed in operation 1130 need not be completely fused to the lower layer of the fused assembly.

In some cases, at least a portion of a boundary region between the glass layers may be detected by the unaided eye or using other techniques after the operation of fusing the glass layers. At least a portion of a boundary region may be detected, for example, as an area of incomplete fusion, as a particle of graphite or another material originating from the thermoforming apparatus, or both. In some cases, the boundary region may be observed by sectioning the glass member and/or using non-destructive techniques. Suitable techniques for observing the boundary region include, but are not limited to, microscopy, elemental analysis, optical interference detection, ultrasonic detection, and the like. As referred to herein, a "glass member," a "glass layer," a "glass component," and/or a "glass piece" may include some relatively small amount of impurities or crystalline material, such as 1% or less, 2% or less, or 5% or less by weight of the member.

In other cases, the fusion may be sufficiently complete that a distinct boundary region may not be detected with the unaided eye between the portions of the fused assembly corresponding to the layers of the assembly. For example, a distinct boundary region may not be detected with the unaided eye when the two adjacent layers of glass have a similar composition and fusion between these glass layers is substantially complete.

The process 1100 may also include an operation of cooling the fused assembly. The cooling of the fused assembly may be sufficiently gradual that thermally induced residual stresses are minimized. In some cases, the cooling may be performed in several stages. By the way of example, a cooling operation may control the cooling of the fused assembly until the temperature of the fused assembly is less than or equal to the strain point of the glass(es). In some embodiments, a density of the external surface of the thicker portion of the fused assembly is greater than a density of the external surface of the thinner portion of the fused assembly (e.g., adjacent the thicker portion).

In some cases, a property of the glass varies across the cooled fused assembly. For example, the density of the glass may vary across the cooled fused assembly even though the lower glass layer and the upper glass layer(s) may have substantially the same density prior to the process 1100. For example, the density of the glass on the raised region (e.g., the plateau region) of the protruding feature may be greater than the density of the glass on the base region of the external surface.

As shown in FIG. 11, the operation 1100 includes an operation 1130 of shaping and texturing the fused assembly to form the glass member. In some embodiments, the operation of shaping the fused assembly includes at least one step of removing material from the fused assembly. In some cases, the at least one step of removing material from the fused assembly includes at least one mechanical removal step, such as a grinding or polishing step.

Typically, material is removed from the external surfaces of both the thicker and the thinner portions of the fused assembly. Material may also be removed from the internal surfaces of the thicker and the thinner portions of the fused assembly. For example, the material removal steps may be used to produce exterior and interior surfaces that are sufficiently level. The amount of material removed from the external surface may be from about 2% to about 30% of the thicker portion and from about 5% to about 40% of the thinner portion. In some cases, the amount of material removed is from about 0.05 mm to about 0.5 mm. This material removal may produce a fusion zone which is elevated with respect to the exterior surface of the base region (e.g., from about 0.05 mm to about 0.5 mm).

In some cases, a material removal step may also remove material from the side of the thicker portion of the fused assembly. This material removal step may create the desired side profile of the protruding feature and/or may remove parts of the upper glass layer(s) that have not fused to the lower glass layer as illustrated in FIGS. 12A and 12B. Typically, the fused assembly has a shape corresponding to that of the glass member following these material removal steps. In addition, the operation 1130 may include forming one or more holes and/or enlarging one or more pilot holes in the fused assembly (e.g., by machining).

Typically, operation 1130 also includes texturing the fused assembly to produce one or more surface textures (e.g., a polished texture or a rougher texture). Texturing techniques that may be used in the operation 1130 include, but are not limited to, chemical etching, mechanical removal of material such as abrasive treatment, laser ablation, lithography in combination with etching, and combinations thereof. In some cases, a laser ablation technique may involve multiple operations of directing a sequence of laser pulses onto a surface of the fused assembly. In some cases, the member may have multiple textured regions. Each of the various textured regions of the member may have similar textures to each other or may have different textures from each other. Different textures may result from using different process conditions in a single type of texturing process or may result from using different types of texturing processes. In some embodiments, a textured region of the member may have a texture formed by overlap of two different textures. Such a texture may result from using two different texturing processes to create the textured region.

Figure 17:
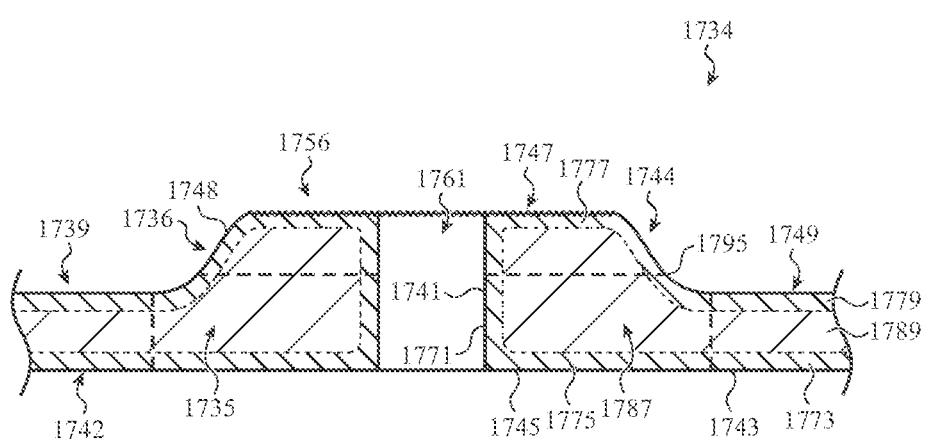
FIG. 17 schematically shows a cross-section view of a member after chemical strengthening.

The process 1100 also includes an operation 1140 of chemically strengthening the glass member. The operation of chemically strengthening a member may include an ion exchange operation. During the ion exchange operation, ions present in the member can be exchanged for larger ions in an ion-exchanged zone extending from a surface of the member. A compressive stress layer extending from a surface of the member may be formed in the ion-exchanged zone. FIG. 17 schematically illustrates compressive stress layers formed along various surfaces of a member such as a glass member. In some cases, the operation 1140 includes multiple ion exchange operations. In some embodiments, a compressive stress layer is formed at each of exterior surface and the interior surface of the member. A tensile stress layer may be formed between these compressive stress layers.

For example, an ion-exchangeable glass material of the member may include monovalent or divalent ions such as alkali metal ions (e.g., $Li^+$, $Na^+$, or $K^+$) or alkaline earth ions (e.g., $Ca^{2+}$ or $Mg^{2+}$) that may be exchanged for other alkali metal or alkaline earth ions. If a glass member comprises sodium ions, the sodium ions may be exchanged for potassium ions. Similarly, if the glass member comprises lithium ions, the lithium ions may be exchanged for sodium ions and/or potassium ions.

In an example, the chemical strengthening process involves exposing the member to a medium containing the larger ion, such as by immersing the member in a bath containing the larger ion or by spraying or coating the member with a source of the ions. For example, a salt bath comprising one or more ions of interest (e.g., a bath containing potassium ions or a mixture of potassium ions and sodium ions) may be used for ion exchange. Suitable temperatures for ion exchange are above room temperature and are selected depending on process requirements. The ion exchange process may be conducted at a temperature below the strain point of the glass. The member may be cooled following the ion exchange operation. Depending on the factors already discussed above, a compressive stress layer as deep as about 10-250 microns can be formed in a glass member. The surface compressive stress (CS) may be from about 300 MPa to about 1100 MPa. A mask can be used to shield portions of the glass member from ion exchange as desired. Optionally, the member is washed after the ion exchange operation 1140.

When a property of the glass varies across the cooled fused assembly the surface compressive stress and/or the depth of the compressive stress layer may vary across the glass member. For example, a surface compressive stress at the raised region (e.g., the plateau region) of the protruding feature may be greater than a surface compressive stress at the base region of the external surface. FIG. 17 schematically illustrates differences in the depth of the compressive stress layer along the raised region and the base region of a glass member. As previously discussed, the density of the glass may vary across the cooled fused assembly.

Processes for forming members as disclosed herein are not limited to the example of FIG. 11. In some cases, a process for forming a composite member may include steps similar to those of process 1100. For example, a composite member may be formed by bonding a glass layer to a layer of a glass ceramic material. The glass ceramic material may be similar in composition to the glass material of the glass layer. As an additional example, a composite member may be formed by bonding a glass layer to a layer of a ceramic material, such as sapphire (aluminum oxide). The glass ceramic or ceramic material may define the raised or top portion of the protruding feature. In some cases, the glass ceramic or ceramic may be transparent to visible light, infrared radiation, ultraviolet radiation, or combinations thereof.

FIGS. 12A to 12C schematically show cross-section views of stages of an example process for forming a member. The member 1234 shown in FIG. 12C may be an example of the member 134 of FIG. 1B or any other member or member described herein. In some cases, the cross-section views perpendicular to the views of FIGS. 12A to 12C are similar in nature, although the lateral dimensions of the layers and portions may vary.

FIG. 12A schematically illustrates application of pressure P to an assembly of two layers in order to fuse the layers of the assembly. In the example of FIG. 12A, the assembly 1214 includes an upper layer 1276 and a lower layer 1279. The upper layer 1276 contacts an upper surface 1219 of the lower layer 1279 and the boundary between these layers defines an interface 1215. As shown in FIG. 12A, a side surface 1218 of the upper layer 1276 defines a rounded shape. The example of FIG. 12A is not limiting and the side surface 1218 may define any of a number of shapes, including a substantially planar shape or a substantially planar shape with chamfered or rounded corners. In some cases, the upper layer 1276 and the lower layer 1279 are glass layers. The vertical dashed lines in FIG. 12A schematically indicate a lateral dimension of the upper layer 1276.

A tool-piece 1225 is used to apply pressure to the upper surface 1217 of the upper layer 1276 during the fusing operation. As shown in FIG. 12A, the tool-piece may have the form of a plunger with a flat bottom. Typically, the upper layer 1276, the lower layer 1279, and the tool-piece 1225 are at an elevated temperature during the thermoforming process. At least a bottom portion of the tool-piece 1225 is typically formed from a material suitable for use at these elevated temperatures. The pressure and the temperature during the fusing operation may be as previously described with respect to operation 1120 of process 1100 and, for brevity, those details are not repeated here. Typically, the layers 1276 and 1279 are supported as the pressure is being applied, such as by a support 1210.

FIG. 12B schematically illustrates a fused assembly 1224 formed from two layers. A second component 1286 of the fused assembly 1224 has been formed from the upper layer 1276 and a first component 1289 of the fused assembly has been formed from the lower layer 1279. The dashed line 1285 divides the first component 1286 from the second component 1289 and may be located at the position of the interface 1215 of FIG. 12A. In some cases, each of the upper layer 1276 and the lower layer 1279 are glass layers and each of the first component 1289 and the second component 1286 are glass components. The vertical dashed lines in FIG. 12B schematically indicate a lateral dimension of the second component.

FIG. 12C schematically illustrates the member 1234 formed by shaping and texturing the fused assembly 1224 of FIG. 12B. The member 1234 defines a protruding feature 1236 which in turn defines a raised region 1247 and a side region 1248 of the exterior surface. The member 1234 also defines a base portion 1239 that defines a base region 1249 of the exterior surface 1244. The raised region 1247 is elevated with respect to a base region 1249 of the exterior surface 1244. The member 1234 also includes through-holes 1267 and 1268 that extend from the interior surface 1242 to the exterior surface 1244. The first and second components 1299 and 1296 of the member 1234 are respectively formed from the first and second components 1289 and 1286 of the fused assembly 1224. The member 1234 may be a glass member and the first and the second components 1299 and 1296 may be glass components. The vertical dashed lines in FIG. 12C schematically indicate a lateral dimension of the protruding feature.

Comparison of FIGS. 12B and 12C shows that material has been removed from the fused assembly 1224 to form the member 1234, although the amount of material removed is not necessarily shown to scale. For example, material has been removed from an external surface 1229 of the first component 1289 and the external surface 1227 of the second component 1286 of the fused assembly 1224 to produce the external surface 1249 and the external surface 1247 of the member 1234.

In addition, material has been removed from the side surface 1228 of the second component 1286 to form the side surface 1248. In some cases, the side surface 1228 meets the surface 1229 to define an undercut between the first component 1289 and the second component 1286. In these cases, sufficient material may be removed from the side surface 1228 that the side surface 1248 defines a smoothly curved profile instead of an undercut. The operation(s) of removing material from the fused assembly 1224 may be any of the material removal steps described with respect to operation 1130 of process 1100 and, for brevity, that description is not repeated here. As shown in FIG. 12C, the side surface 1248 defines a smoothly curved profile. For example, the side surface may define a spline between the external surface 1247 and the external surface 1249.

One effect of removing material from the fused assembly 1224 may be that the protruding feature 1236 is at least partly formed from the first component 1299 as well as the second component 1296. Since the dashed line 1295 that divides the first component 1296 from the second component 1299 is elevated with respect to the exterior surface 1249, a lower or base part of the protruding feature 1236 is formed from the first component 1299 in FIG. 12C.

In the example of FIG. 12C, the raised region 1247 has a rougher texture than the base region 1249 and the side region 1248. The example of FIG. 12C is not limiting and in some cases the base region 1249 and the side region 1248 may have a rougher texture than the raised region 1247. In additional cases, the raised region 1247, the side region 1248, and the base region 1249 may all have similar textures. The description of textured regions provided with respect to FIGS. 6 to 10 is generally applicable here and, for brevity, is not repeated here.

Figure 13C:
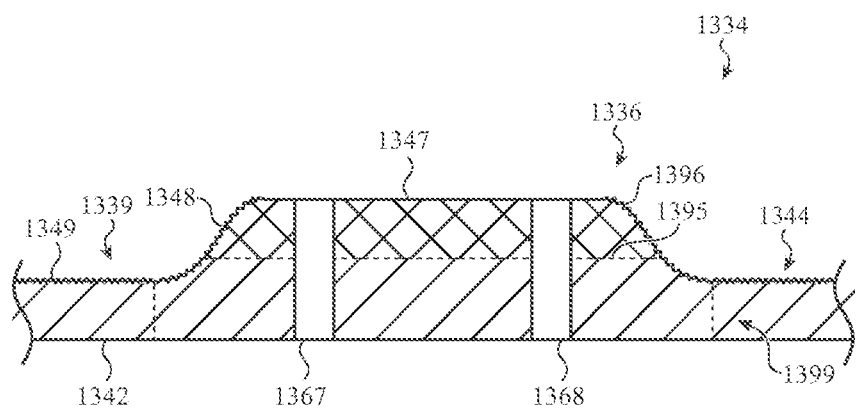

FIGS. 13A to 13C schematically show cross-section views of stages of an additional example process for forming a member. In the example of FIGS. 13A to 13C, a layer of the assembly of layers is provided with holes that serve as pilot holes for the through-holes of the member. In some cases, the cross-section views perpendicular to the views of FIGS. 13A to 13C are similar in nature, although the lateral dimensions of the layers and portions may vary.

In the example of FIG. 13A, the assembly 1314 includes an upper layer 1376 and a lower layer 1379. The upper layer 1376 defines a side surface 1318. The upper layer 1376 includes through-holes 1311 and 1312. The through-holes 1311 and 1312 can function as pilot holes for the through-holes 1367 and 1368 of the member 1334. The upper layer 1376 contacts an upper surface 1319 of the lower layer 1379 and the boundary between these layers defines an interface 1315. The shapes of the upper and lower layers 1376 and 1379 shown in the example of FIG. 13A are not limiting. In additional examples, the lower layer 1379 additionally or alternately includes pilot holes similar to the holes 1311 and 1312. In some cases, each of the upper layer 1376 and the lower layer 1379 is a glass layer. The vertical dashed lines in FIG. 13A schematically indicate a lateral dimension of the upper layer 1376.

A tool-piece 1325 is used to apply pressure P to the upper surface 1317 of the upper layer 1376 during the fusing operation and a support 1310 may support the assembly 1314 in a similar manner as previously described with respect to FIG. 12A. For brevity, that description is not repeated here. FIG. 13B schematically illustrates a fused assembly 1324. A second component 1386 of the fused assembly 1324 has been formed from the upper layer 1376 and defines an upper surface 1327 and a side surface 1328. The second component 1386 includes holes 1321 and 1322 that correspond to the holes 1311 and 1312. A first component 1389 of the fused assembly has been formed from the lower layer 1379 and defines an upper surface 1329. The dashed line 1385 divides the second component 1386 from the first component 1389 and may be located at the position of the interface 1385 of FIG. 13A. When the upper layer 1376 and the lower layer 1379 are glass layers, the first component 1389 and the second component 1386 may be glass components. The vertical dashed lines in FIG. 13B schematically indicate a lateral dimension of the second component.

FIG. 13C schematically illustrates the member 1334 formed by shaping and texturing the fused assembly 1324 of FIG. 13B. The first and the second components 1399 and 1396 of the member 1334 are respectively formed from the first and second components 1389 and 1386 of the fused assembly 1324. The member 1334 may be a glass member and the first and the second components 1399 and 1396 may be glass components.

The member 1334 shown in FIG. 13C may be an example of the member 134 of FIG. 1B or any other member or cover member described herein. The member 1334 defines a protruding feature 1336 that in turn defines a raised region 1347 and a side region 1348 of the exterior surface 1344. The member 1334 also defines a base portion 1339 that defines a base region 1349 of the exterior surface 1344. The raised region 1347 is elevated with respect to the base region 1349. The member 1334 also includes through-holes 1367 and 1368 that extend from the interior surface 1342 to the exterior surface 1344. The holes 1321 and 1322 provided pilot holes for the through-holes 1367 and 1368. The vertical dashed lines in FIG. 13C schematically indicate a lateral dimension of the protruding feature.

Similarly to the member 1234 of FIG. 12C, the protruding feature 1336 is at least partly formed from the first component 1399 as well as the second component 1396 and the dashed line 1395 that divides the first component 1399 from the second component 1396 is elevated with respect to the exterior surface 1349. In the example of FIG. 13C, the raised region 1347 has a smoother texture than the base region 1349 and the side region 1348. It should be understood that this example is not limiting and the textures of the raised region 1347, the side region 1348, and the base region 1347 may be any texture described herein.

Figure 14B:
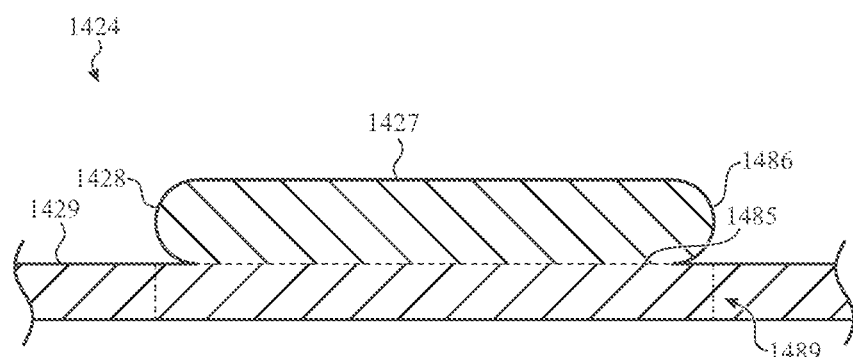
Figure 14C:
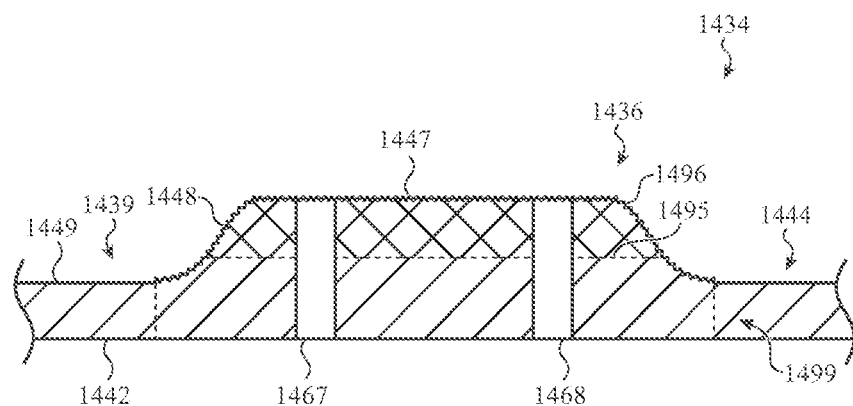

FIGS. 14A to 14C schematically show cross-section views of stages of an example process for forming a member. In the example of FIGS. 14A to 14C, an upper layer of the assembly of layers defines a localized interface with a lower layer. Fusion can then proceed outward from the localized interface. In some cases, the cross-section views perpendicular to the views of FIGS. 14A to 14C are similar in nature, although the lateral dimensions of the layers and portions may vary.

In the example of FIG. 14A, the assembly 1414 includes an upper layer 1476 and a lower layer 1479. In some cases, the upper layer 1476 is a glass layer and in additional cases each of the upper layer 1476 and the lower layer 1479 is a glass layer. An upper surface 1417 of the upper layer 1476 defines a concave shape while a lower surface 1416 of the upper layer 1476 defines a convex shape. Due to the convex shape of the lower surface 1416, the interface 1415 between the lower surface 1416 and the upper surface 1419 of the lower layer 1479 is localized. In the example of FIG. 14A, the interface 1415 is localized to a central portion of the upper layer 1476. The shapes of the upper and lower layers 1476 and 1479 shown in the example of FIG. 14A are not limiting. For example, the shape of the side surface 1418 of the upper layer 1476 may be as described with respect to FIG. 12A and, for brevity, that description is not repeated here.

During the operation of fusing the assembly 1414, fusion may start at the interface 1415. After fusion begins at the interface 1415, a fusion front can then move outwards towards the side surfaces 1418 of the upper layer. FIGS. 16A to 16B schematically illustrate such movement of the fusion front.

FIG. 14B schematically illustrates a fused assembly 1424. A second component 1486 of the fused assembly 1424 has been formed from the upper layer 1476 and a first component 1489 of the fused assembly has been formed from the lower layer 1479. For example, the second component 1486 may be a second glass component formed from an upper glass layer and the first component 1489 may be a first glass component formed from a lower glass layer. The dashed line 1485 divides the second component 1486 from the first component 1489 and may be located at the position of the interface 1415 of FIG. 14A. The second component 1486 defines an upper surface 1427 and a side surface 1428. The first component 1489 defines an upper surface 1429. The vertical dashed lines in FIG. 14B schematically indicate a lateral dimension of the second component.

FIG. 14C schematically illustrates the member 1434 formed by shaping and texturing the fused assembly 1424 of FIG. 14B. The first and second components 1499 and 1496 of the member 1434 are respectively formed from the first and second components 1489 and 1486 of the fused assembly 1424. When the member 1434 is a glass member, the first and second glass components (1499 and 1496) of the glass member 1434 are respectively formed from the first and second glass components (1489 and 1486) of the fused assembly 1424.

The member 1434 shown in FIG. 14C may be an example of the member 134 of FIG. 1B or any other member or cover member described herein. The member 1434 defines a protruding feature 1436 that in turn defines a raised region 1447 and a side region 1448 of the exterior surface. The member 1434 also defines a base portion 1439 that defines a base region 1449 of the exterior surface 1444. The raised region 1447 is elevated with respect to a base region 1449 of the exterior surface 1444. The member 1434 also includes through-holes 1467 and 1468 that extend from the interior surface 1442 to the exterior surface 1444. The vertical dashed lines in FIG. 14C schematically indicate a lateral dimension of the protruding feature.

Similarly to the member 1234 of FIG. 12C, the protruding feature 1436 is at least partly formed from the first component 1499 as well as the second component 1496 and the dashed line 1495 that divides the first component 1499 from the second component 1496 is elevated with respect to the base region 1449. In the example of FIG. 14C, the side region 1448 is defined by both the first component 1499 and the second component 1496. The first component 1499 at least partly defines a concave portion of the side region 1448.

In the example of FIG. 14C, the raised region 1447 and the side region 1448 have a rougher texture than the base region 1449. It should be understood that this example is not limiting and the textures of the raised region 1447, the side region 1448, and the base region 1447 may be any texture described herein.

Figure 15B:
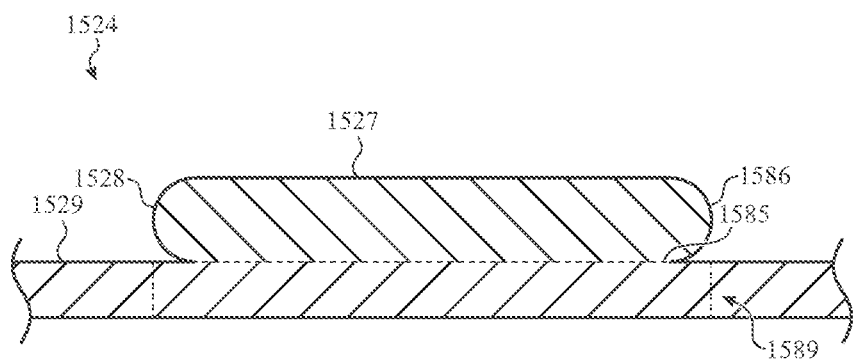
Figure 15C:
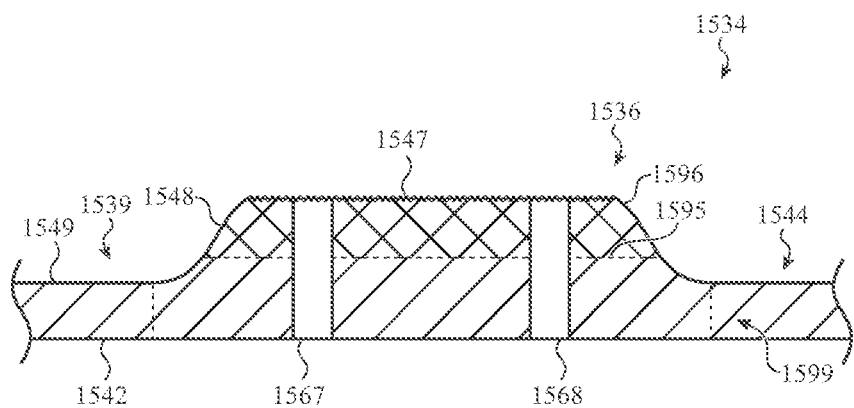

FIGS. 15A to 15C schematically show cross-section views of stages of a further example process for forming a member. In the example of FIGS. 15A to 15C, an upper layer of the assembly of layers defines a localized interface with a lower layer. Fusion can then proceed outward from the localized interface. In some cases, the cross-section views perpendicular to the views of FIGS. 15A to 15C are similar in nature, although the lateral dimensions of the layers and portions may vary.

In the example of FIG. 15A, an assembly 1514 includes an upper layer 1576 and a lower layer 1579. In some cases, the upper layer 1576 is a glass layer and in additional cases each of the upper layer 1576 and the lower layer 1579 is a glass layer. A lower surface 1516 of the upper layer 1576 defines a convex surface. The upper surface 1517 of the upper layer 1576 may be substantially flat. The upper layer 1576 contacts an upper surface 1519 of the lower layer 1579 and the boundary between these layers defines an interface 1515. Due to the convex shape of the lower surface 1516, the interface 1515 is localized. In the example of FIG. 15A, the interface 1515 is localized to a central portion of the upper layer 1576. The shapes of the upper and lower layers 1576 and 1579 shown in the example of FIG. 15A are not limiting. For example, the shape of the side surface 1518 of the upper layer 1576 may be as described with respect to FIG. 12A and, for brevity, that description is not repeated here.

During the operation of fusing the assembly 1514, fusion may start at the interface 1515. After fusion begins at the interface 1515 a fusion front can then move outwards towards the side surfaces 1518 of the upper layer. FIGS. 16A to 16B schematically illustrate such movement of the fusion front.

FIG. 15B schematically illustrates a fused assembly 1524 formed from two layers. A second component 1586 of the fused assembly 1524 has been formed from the upper layer 1576 and a first component 1589 of the fused assembly has been formed from the lower layer 1579. The second component 1586 may be a second glass component formed from a glass upper layer and a first component 1589 may be a first glass component formed from a glass lower layer. The dashed line 1585 divides the second component 1586 from the first component 1589 and may be located at the position of the interface 1515 of FIG. 15A. The second component 1586 defines an upper surface 1527 and a side surface 1528. The first component 1589 defines an upper surface 1529. The vertical dashed lines in FIG. 15B schematically indicate a lateral dimension of the second component.

FIG. 15C schematically illustrates the member 1534 formed by shaping and texturing the fused assembly 1524 of FIG. 15B. The first and second components 1599 and 1596 of the glass member 1534 are respectively formed from the first and second components 1589 and 1586 of the fused assembly 1524. The first and second components 1599 and 1596 may be first and second glass components of the glass member 1534 which are respectively formed from first and second glass components (1589 and 1586) of the fused assembly 1524.

The member 1534 shown in FIG. 15C may be an example of the member 134 of FIG. 1B or any other member or cover member described herein. The member 1534 defines a protruding feature 1536 that in turn defines a raised region 1547 and a side region 1548 of the exterior surface. The member 1534 also defines a base portion 1539 that defines a base region 1549 of the exterior surface 1544. The raised region 1547 is elevated with respect to a base region 1549 of the exterior surface 1544. The member 1534 also includes through-holes 1567 and 1568 that extend from the interior surface 1542 to the exterior surface 1544. The vertical dashed lines in FIG. 15C schematically indicate a lateral dimension of the protruding feature.

Similarly to the member 1234 of FIG. 12C, the protruding feature 1536 is at least partly formed from the first component 1599 as well as the second component 1596 and the dashed line 1595 that divides the first component 1599 from the second component 1596 is elevated with respect to the exterior surface 1549. In addition, the raised region 1547 has a rougher texture than the base region 1549 and the side region 1548 although this example is not limiting and the textures of the raised region 1547, the side region 1548, and the base region 1547 may be any texture described herein.

FIGS. 16A and 16B schematically illustrate a top view of stages in fusing two layers, with FIG. 16B showing a later stage than FIG. 16A. In the example of FIGS. 16A and 16B, fusion begins in a central region of the upper layer and moves outward towards the sides 1628 of the upper layer. In some cases, movement of a fusion front outwards from the center of the upper glass improves fusion between the upper and the lower layers. For example, the size and/or number of voids formed at the interface between the upper and the lower layers may be reduced. The layers shown in FIGS. 16A to 16B may be as described with respect to FIG. 11 and, for brevity, that description is not repeated here. In some cases, each of the upper and lower layers are glass layers.

As shown in FIG. 16A, an upper layer 1676 assembled with a lower layer 1679 has been partially fused to form partially fused assembly 1616. The upper layer 1676 is bonded to the lower layer 1679 within a fused area 1636 encircled by a dashed line, that schematically illustrates a fusion front 1646. The fused area 1636 includes a central region of the upper layer 1676. The arrows schematically illustrate the direction of motion of the fusion front 1646 towards the side 1628 of the upper layer 1676. For convenience of illustration, the shape of the fusion front 1646 is shown as circular, but this example is not limiting, and the shape of the fusion front need not be circular and may be somewhat irregular. In some cases, the upper layer 1676 may be shaped as described with respect to FIG. 14A or 15A.

FIG. 16B schematically illustrates a later stage of the fusion operation to bond the upper layer 1676 to the lower layer 1679. The partially fused assembly 1618 includes fused area 1638 encircled by the dashed line 1648. The fused area 1638 is greater than the fused area 1636 shown in FIG. 16A and has moved further towards the side 1628 of the upper layer 1676. The arrows schematically illustrate the direction of motion of the fusion front 1648. For convenience of illustration, the shape of the fusion front 1648 is shown as circular, but this example is not limiting, and the shape of the fusion front need not be circular and may be somewhat irregular.

FIG. 17 schematically shows a cross-section view of a member 1734 after chemical strengthening. The member 1734 may be a glass member. In the example of FIG. 17, the chemical strengthening is not uniform over the member 1734. In particular, the chemical strengthening is different along a raised region 1747 as compared to a base region 1749 of the exterior surface 1744.

In some cases, the member 1734 is formed by fusing two glass layers and the dashed line 1795 schematically illustrates a fusion zone. The member 1734 includes a protruding feature 1736, a portion 1735 underlying the protruding feature 1736, and a base portion 1739. The member also defines a hole 1761 extending through the protruding feature 1736 and the underlying portion 1735. The member 1734 also includes a textured region 1756 and a side region 1748. The member 1734 shown in FIG. 17 may be an example of the member 134 of FIG. 1B or any other member or cover member described herein.

In the example of FIG. 17, the compressive stress layer 1777 extending from the raised region 1747 differs from the compressive stress layer 1779 extending from the base region 1749 of the exterior surface 1744. As shown in FIG. 17, the depth of the compressive stress layer 1777 is less than the depth of the compressive stress layer 1779. For example, the difference in the depth may be from 10% to 50% of the depth of the compressive stress layer 1779. As examples, the depth of the compressive stress layer 1779 may be from 165 microns to 250 microns, from 100 microns to 250 microns, or from 125 microns to 250 microns. Additionally or alternately, a magnitude of the surface compressive stress of the compressive stress layer 1777 may be greater than a magnitude of the surface compressive stress of the compressive stress layer 1779. For example, the difference in the magnitude of the surface compressive stress may be from 10% to 50% of the magnitude of the surface compressive stress of the compressive stress layer 1779. Further, a hardness of raised region 1747 may be greater than a hardness of the base region 1749. The difference in the surface compressive stress and/or depth of these compressive stress layers may be due at least in part to changes in a property of the glass of the protruding feature 1736 during the fusing operation, as previously discussed with respect to FIG. 11. It should be understood that the compressive stress layers depicted are not necessarily shown to scale.

As shown in FIG. 17, member 1734 also includes a compressive stress layer 1773 along a region 1743 of the interior surface 1742 defined by the base portion 1739. The member 1734 also includes a compressive stress layer 1775 along a region 1745 of the interior surface 1742 defined by the portion 1735. In some cases, the compressive stress layer 1775 may be different than the compressive stress layer 1773. For example, the compressive stress layer 1775 may have a magnitude of surface compressive stress that is greater than that of the compressive stress layer 1773. Further the compressive stress layer 1775 may have a depth that is less than that of the compressive stress layer 1773, so that the compressive stress layer 1775 is shallower than the compressive stress layer 1773. In some cases, the magnitude and/or the depth of the compressive stress layer 1775 may be similar to that of the compressive stress layer 1777.

The member 1734 also includes a compressive stress layer 1771 extending from a wall surface 1741 defining a through-hole 1761. A tensile stress layer 1789 is positioned between the compressive stress layers 1779 and 1773. A tensile stress layer 1787 is positioned between the compressive stress layers 1777 and 1775.

Each of the compressive stress layers 1771, 1773, 1775, 1777, and 1779 are located in ion-exchanged zones of the member 1734. The composition of the member in the ion-exchanged zone is modified by the chemical strengthening operation from its composition prior to ion exchange (also referred to as a baseline composition). However, the member 1734 typically includes one or more zones that are substantially free of ion exchange and the composition of the member in these zones may be substantially the same as the composition(s) of the glass layers used to form the fused assembly. As previously discussed, in some cases the glass layers used to form the fused assembly have substantially the same composition.

The baseline composition(s) of different portions of the member can thus be compared by comparing the compositions within zones within the different portions that are substantially free of ion-exchange. For example, an ion-exchanged zone extends from the base region 1749 and the compressive stress layer 1779 is located within this ion-exchanged zone. An ion-exchanged zone extends from the region 1743 and the compressive stress layer 1773 is located within this ion-exchanged zone. The composition of a central zone between (also, inward of) these two ion-exchanged zones can therefore establish a baseline composition of the base portion 1739. Similarly, a baseline composition of the protruding feature 1736 can be established by measuring the composition of a central zone inward of the ion exchanged layers extending from the surfaces 1741, 1745, and 1747.

In some cases, a baseline composition of the protruding feature 1736 can be measured adjacent the fusion zone between a first component and a second component (e.g., first and second glass components) and a baseline composition of the base portion can also be measured adjacent this fusion zone. For example, a composition may be measured 50 microns, 100 microns, 200 microns, 300 microns, or 400 microns away from the fusion zone so long as the composition is not measured within an ion-exchanged zone. When the composition of the glass layers used to form the fused assembly is substantially the same, a baseline composition of the base portion of the member 1734 may be substantially the same as a baseline composition of an upper part of the protruding feature (above the fusion zone 1795). For example, a glass member may comprise a first glass component having a first composition adjacent a fusion zone between the first glass component, a second glass component having a second composition adjacent the fusion zone, and the first composition may be substantially equal to the second composition.

FIG. 18 shows a block diagram of a sample electronic device that can incorporate a member as described herein, such as a glass cover member. The schematic representation depicted in FIG. 18 may correspond to components of the devices depicted in FIGS. 1A to 17 as described above. However, FIG. 18 may also more generally represent other types of electronic devices with cover assemblies as described herein.

In embodiments, an electronic device 1800 may include sensors 1820 to provide information regarding configuration and/or orientation of the electronic device in order to control the output of the display. For example, a portion of the display 1808 may be turned off, disabled, or put in a low energy state when all or part of the viewable area of the display 1808 is blocked or substantially obscured. As another example, the display 1808 may be adapted to rotate the display of graphical output based on changes in orientation of the device 1800 (e.g., 90 degrees or 180 degrees) in response to the device 1800 being rotated.

The electronic device 1800 also includes a processor 1806 operably connected with a computer-readable memory 1802. The processor 1806 may be operatively connected to the memory 1802 component via an electronic bus or bridge. The processor 1806 may be implemented as one or more computer processors or microcontrollers configured to perform operations in response to computer-readable instructions. The processor 1806 may include a central processing unit (CPU) of the device 1800. Additionally, and/or alternatively, the processor 1806 may include other electronic circuitry within the device 1800 including application specific integrated chips (ASIC) and other microcontroller devices. The processor 1806 may be configured to perform functionality described in the examples above.

The memory 1802 may include a variety of types of non-transitory computer-readable storage media, including, for example, read access memory (RAM), read-only memory (ROM), erasable programmable memory (e.g., EPROM and EEPROM), or flash memory. The memory 1802 is configured to store computer-readable instructions, sensor values, and other persistent software elements.

The electronic device 1800 may include control circuitry 1810. The control circuitry 1810 may be implemented in a single control unit and not necessarily as distinct electrical circuit elements. As used herein, "control unit" will be used synonymously with "control circuitry." The control circuitry 1810 may receive signals from the processor 1806 or from other elements of the electronic device 1800.

As shown in FIG. 18, the electronic device 1800 includes a battery 1814 that is configured to provide electrical power to the components of the electronic device 1800. The battery 1814 may include one or more power storage cells that are linked together to provide an internal supply of electrical power. The battery 1814 may be operatively coupled to power management circuitry that is configured to provide appropriate voltage and power levels for individual components or groups of components within the electronic device 1800. The battery 1814, via power management circuitry, may be configured to receive power from an external source, such as an alternating current power outlet. The battery 1814 may store received power so that the electronic device 1800 may operate without connection to an external power source for an extended period of time, which may range from several hours to several days.

In some embodiments, the electronic device 1800 includes one or more input devices 1818. The input device 1818 is a device that is configured to receive input from a user or the environment. The input device 1818 may include, for example, a push button, a touch-activated button, a capacitive touch sensor, a touch screen (e.g., a touch-sensitive display or a force-sensitive display), a capacitive touch button, a dial, a crown, or the like. In some embodiments, the input device 1818 may provide a dedicated or primary function, including, for example, a power button, volume buttons, home buttons, scroll wheels, and camera buttons.

The device 1800 may also include one or more sensors 1820, such as a force sensor, a capacitive sensor, an accelerometer, a barometer, a gyroscope, a proximity sensor, a light sensor, or the like. The sensors 1820 may be operably coupled to processing circuitry. In some embodiments, the sensors 1820 may detect deformation and/or changes in configuration of the electronic device and be operably coupled to processing circuitry that controls the display based on the sensor signals. In some implementations, output from the sensors 1820 is used to reconfigure the display output to correspond to an orientation or folded/unfolded configuration or state of the device. Example sensors 1820 for this purpose include accelerometers, gyroscopes, magnetometers, and other similar types of position/orientation sensing devices. In addition, the sensors 1820 may include a microphone, an acoustic sensor, a light sensor (including ambient light, infrared (IR) light, ultraviolet (UV) light, optical facial recognition sensor, a depth measuring sensor (e.g., a time of flight sensor), a health monitoring sensor (e.g., an electrocardiogram (ecg) sensor, a heart rate sensor, a photoplethysmogram (ppg) sensor, a pulse oximeter, a biometric sensor (e.g., a fingerprint sensor), or other types of sensing device.

In some embodiments, the electronic device 1800 includes one or more output devices 1804 configured to provide output to a user. The output device 1804 may include display 1808 that renders visual information generated by the processor 1806. The output device 1804 may also include one or more speakers to provide audio output. The output device 1804 may also include one or more haptic devices that are configured to produce a haptic or tactile output along an exterior surface of the device 1800.

The display 1808 may include a liquid-crystal display (LCD), a light-emitting diode (LED) display, an LED-backlit LCD display, an organic light-emitting diode (OLED) display, an active layer organic light-emitting diode (AMOLED) display, an organic electroluminescent (EL) display, an electrophoretic ink display, or the like. If the display 1808 is a liquid-crystal display or an electrophoretic ink display, the display 1808 may also include a backlight component that can be controlled to provide variable levels of display brightness. If the display 1808 is an organic light-emitting diode or an organic electroluminescent-type display, the brightness of the display 1808 may be controlled by modifying the electrical signals that are provided to display elements. In addition, information regarding configuration and/or orientation of the electronic device may be used to control the output of the display as described with respect to input devices 1818. In some cases, the display is integrated with a touch and/or force sensor in order to detect touches and/or forces applied along an exterior surface of the device 1800.

The electronic device 1800 may also include a communication port 1812 that is configured to transmit and/or receive signals or electrical communication from an external or separate device. The communication port 1812 may be configured to couple to an external device via a cable, adaptor, or other type of electrical connector. In some embodiments, the communication port 1812 may be used to couple the electronic device 1800 to a host computer.

The electronic device 1800 may also include at least one accessory 1816, such as a camera, a flash for the camera, or other such device. The camera may be part of a camera assembly that may be connected to other parts of the electronic device 1800 such as the control circuitry 1810.

As used herein, the terms "about," "approximately," "substantially," "similar," and the like are used to account for relatively small variations, such as a variation of +/−10%, +/−5%, +/−2%, or +/−1%. In addition, use of the term "about" in reference to the endpoint of a range may signify a variation of +/−10%, +/−5%, +/−2%, or +/−1% of the endpoint value. In addition, disclosure of a range in which at least one endpoint is described as being "about" a specified value includes disclosure of the range in which the endpoint is equal to the specified value.

The following discussion applies to the electronic devices described herein to the extent that these devices may be used to obtain personally identifiable information data. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An electronic device comprising:
   a display;
   an enclosure comprising:
     a front cover assembly including a front member positioned over the display; and
     a rear cover assembly including a rear member defining a feature that protrudes with respect to a base region of an exterior surface of the rear member, the rear member comprising:
       a first glass component defining the base region of the exterior surface; and
       a second glass component bonded to the first glass component and at least partially defining the feature; and
   a camera assembly coupled to an interior surface of the rear cover assembly, the camera assembly comprising a camera module positioned at least partially within a hole extending through the first glass component and the second glass component.

2. The electronic device of claim 1, wherein:
the first glass component is fused to the second glass component and the feature includes a fusion zone between the first glass component and the second glass component;
the first glass component has a first composition adjacent the fusion zone;
the second glass component has a second composition adjacent the fusion zone; and
the first composition and the second composition are the same.

3. The electronic device of claim 1, wherein:
the first glass component further defines a first portion of a side surface of the feature; and
the second glass component defines a second portion of the side surface of the feature.

4. The electronic device of claim 1, wherein a top surface of the feature has a lower gloss than the base region of the exterior surface.

5. The electronic device of claim 1, wherein:
the second glass component defines a top surface of the feature;
the top surface of the feature defines an opening of the hole; and
an end of the camera module extends into the opening.

6. The electronic device of claim 5, wherein the rear cover assembly further comprises a window positioned over the end of the camera module and coupled to the feature.

7. The electronic device of claim 1, wherein:
the rear member further comprises a third glass component bonded to the second glass component; and
the third glass component defines a top surface of the feature and a window for the camera module.

8. An electronic device comprising:
an enclosure including:
  a housing member defining a side surface of the electronic device; and
  a rear cover assembly coupled to the housing member and including a rear member, the rear member comprising:
    a first glass component defining:
      a base region of an exterior surface of the rear member; and
      a first portion of a hole extending through the rear member; and
    a second glass component bonded to the first glass component and defining:
      a second portion of the hole extending through the rear member; and
      a top surface of a protruding feature extending from the base region of the exterior surface, the top surface defining an opening of the hole; and
a camera assembly coupled to the rear cover assembly and comprising a camera module positioned in the first and the second portions of the hole.

9. The electronic device of claim 8, wherein:
a bond region joins the first glass component to the second glass component; and
the bond region is positioned above the base region of the exterior surface and below the top surface of the protruding feature.

10. The electronic device of claim 8, wherein:
the first glass component is fused to the second glass component;
the first glass component further comprises a first ion-exchanged zone extending into the first glass component from the base region of the exterior surface and having a first hardness; and
the second glass component further comprises a second ion-exchanged zone extending into the second glass component from the top surface of the protruding feature and having a second hardness greater than the first hardness.

11. The electronic device of claim 10, wherein:
each of the first glass component and the second glass component comprises a lithium aluminosilicate glass; and
each of the first ion-exchanged zone and the second ion-exchanged zone includes potassium ions and sodium ions.

12. The electronic device of claim 8, wherein:
the base region of the exterior surface includes a first texture comprising first surface features having a first root mean square height; and
the top surface of the protruding feature includes a second texture having a second root mean square height greater than the first root mean square height.

13. The electronic device of claim 12, wherein the second texture is configured to provide a translucent appearance to the protruding feature.

14. The electronic device of claim 8, wherein:
the base region of the exterior surface includes a first texture comprising first surface features having a first root mean square height; and
the top surface of the protruding feature includes a second texture having a second root mean square height less than the first root mean square height.

15. An electronic device comprising:
an enclosure comprising:
  a rear glass member comprising:
    a first glass piece defining:
      a base region of an exterior surface of the rear glass member; and
      a first portion of a protruding feature, the first portion extending from the base region; and
    a second glass piece fused to the first glass piece and defining a second portion of the protruding feature, the second portion defining a plateau region of the protruding feature; and
  a sensor assembly coupled to an interior surface of the rear glass member and comprising a sensor.

16. The electronic device of claim 15, wherein the protruding feature further defines a fusion zone positioned between the first glass piece and the second glass piece and above the base region.

17. The electronic device of claim 15, wherein:
the first portion defines a side surface of the protruding feature, and
the side surface defines a concave shape.

18. The electronic device of claim 15, wherein:
the first glass piece further comprises a first compressive stress layer extending into the first glass piece from the base region of the exterior surface and having a first surface compressive stress value;
the second glass piece further comprises a second compressive stress layer extending into the second glass piece from the plateau region of the protruding feature and having a second surface compressive stress value; and a magnitude of the second surface compressive stress value is greater than a magnitude of the first surface compressive stress value.

19. The electronic device of claim 18, wherein the first compressive stress layer is shallower than the second compressive stress layer.

20. The electronic device of claim 15, wherein:
the rear glass member defines a through-hole extending through the first portion and the second portion of the protruding feature, and
the sensor extends into the through-hole.

* * * * *